United States Patent
Clements

(10) Patent No.: US 11,537,352 B1
(45) Date of Patent: Dec. 27, 2022

(54) MAP ON A PHONE USED TO FIND AND OPERATE PUBLIC MULTI-USER DEVICES

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 25 days.

(21) Appl. No.: 17/175,713

(22) Filed: Feb. 15, 2021

Related U.S. Application Data

(63) Continuation-in-part of application No. 16/237,981, filed on Jan. 2, 2019, now Pat. No. 10,924,603, which is a continuation-in-part of application No. 15/851,607, filed on Dec. 21, 2017, now abandoned, which is a continuation-in-part of application No. 14/634,788, filed on Feb. 28, 2015, now Pat. No. 10,691,397, which is a continuation-in-part of (Continued)

(51) Int. Cl.
| | |
|---|---|
| *G06F 3/14* | (2006.01) |
| *G06F 3/04817* | (2022.01) |
| *G06F 3/0482* | (2013.01) |
| *H04W 4/30* | (2018.01) |
| *G06F 3/04883* | (2022.01) |
| *G06F 3/01* | (2006.01) |
| *G06F 3/16* | (2006.01) |
| *G06F 3/0488* | (2022.01) |

(52) U.S. Cl.
CPC ............ *G06F 3/1454* (2013.01); *G06F 3/015* (2013.01); *G06F 3/0482* (2013.01); *G06F 3/0488* (2013.01); *G06F 3/04817* (2013.01); *G06F 3/167* (2013.01); *H04W 4/30* (2018.02); *G06F 3/04883* (2013.01)

(58) Field of Classification Search
CPC .... G06F 3/1454; G06F 3/015; G06F 3/04817; G06F 3/0482; G06F 3/0488; G06F 3/167; H04W 4/30
See application file for complete search history.

(56) References Cited

U.S. PATENT DOCUMENTS 6,735,516 B1 * 5/2004 Manson .............. H04M 1/6075
701/410
10,250,733 B1 * 4/2019 Gordon ................... H04M 1/67
(Continued)

FOREIGN PATENT DOCUMENTS

JP 2003171070 A * 6/2003
WO WO-2014030805 A1 * 2/2014 ........... E04H 1/1216

*Primary Examiner* — Michael C Zarroli

(57) ABSTRACT

A phone display, shows an internet map. The map allows a user to search for, and operate, multiuser public devices, such as, a hydrogen car fuelling station. The user finds the device, by viewing the device's location, and the phone's location on the map. For example, the phone searches for, and finds elevators, which are shown on the map. The user finds an elevator, by using the map. The user touches the elevator's displayed menu, to receive the elevator's menu's control panel. The received control panel, is displayed on the phone. The user requests the elevator move to the 4 floor, by touch activating a floor 4 icon, on the phone elevator panel. The phone, and elevator computer communicate, over the internet wirelessly, or wirelessly. The user avoids bacteria, that may be on a store's self serve check out machine's physical touch screen, by operating it with the phone.

18 Claims, 9 Drawing Sheets

Related U.S. Application Data application No. 14/258,013, filed on Apr. 22, 2014, now Pat. No. 9,477,317.

(60) Provisional application No. 61/946,789, filed on Mar. 1, 2014.

(56) References Cited

U.S. PATENT DOCUMENTS

| | | | |
|---|---|---|---|
| 2013/0268887 A1* | 10/2013 | Roussos | G06F 3/0482 715/810 |
| 2014/0309891 A1* | 10/2014 | Ricci | H05K 999/00 701/1 |
| 2015/0137941 A1* | 5/2015 | Bauer | G07C 9/20 340/5.61 |
| 2016/0086418 A1* | 3/2016 | Smolen | G06Q 20/308 700/232 |
| 2016/0328794 A1* | 11/2016 | Schrump | H04L 63/08 |
| 2016/0373296 A1* | 12/2016 | Jeong | H04L 67/1091 |

* cited by examiner

MAP ON A PHONE USED TO FIND AND OPERATE PUBLIC MULTI-USER DEVICES

CROSS REFERENCE TO RELATED APPLICATIONS none
This present application is a continuation in part CIP of application Ser. No. 16/237,981, filing 2019 Jan. 2 which is a continuation in part CIP of application Ser. No. 15/851,607, filed Dec. 21, 2017, which is a continuation in part CIP of application Ser. No. 14/634,788, filed Feb. 1, 2015, which is a continuation in part CIP of application Ser. No. 14/258,013, filed Apr. 22, 2014, and claims the benefit of provisional patent application Ser. No. 61/946,789 filed 2014 Mar. 1, and naming Sigmund Clements as inventor. All the foregoing applications are hereby incorporated herein by reference in their entirety.

FEDERALLY SPONSORED RESEARCH

Not Applicable

SEQUENCE LISTING

Not Applicable

TECHNICAL FIELD OF THE EMBODIMENTS

A phone's operation of a wirelessly connected device.

BACKGROUND OF THE EMBODIMENTS

Avoiding Bacteria on Physical Touch Input Buttons
People have been touching buttons to operates devices, since the devices were used by the public, namely, elevators. Many people don't like to touch input buttons, that may have harmful bacteria on them, such as, public input control panels. Control panel input buttons, which are touched by multiple users, have the problem of accumulating germs on their surfaces, which are transferred from the users to the buttons. The bacteria on the buttons, may be transferred to the users, when they touch the buttons.

Avoiding finger contact with a touch input button, reduces the contact, and transmission, of possibly harmful pathogens on the button. Reducing or eliminating bacterial transmission, from the buttons to the user, reduces the possibility of the user becoming ill, from bacteria transmitted to the user.

A proximity Sensor Used to Detect a User's Hand
Infrared hand sensors are used to operate devices in bathrooms, without a surface, such as, water faucets of sinks, toilet flushers, and hand dryers. In Hospitals hand proximity near a sensor, is used to open doors, without a user needing to touch a surface. The sensors have limited input commands, such as, on or off, which restricts the number of different inputs that can be used, and the sensor may be touched accidentally, by the hand getting too close to the sensor.

Input Buttons Used to Operate Devices
Input buttons, can be touched, and used as input buttons for a device. The buttons can be made by devices, that project on to water droplets, optical illusion devices, and lasers beam projecting plasma. A camera detects when the user touches the water droplets buttons, with their finger. Though the touch free devices are stationary, and not portable, and need a supply of water.

Ineffective Ways to Avoid Bacteria
Some people try to wrap paper around their hand, before control panel buttons, to try to put an antibacterial barrier between their hand and the buttons. The paper barrier is ineffective, since bacteria can easily travel through paper.

People may try to use a piece of clothing, such as, a part of a shirt sleeve as a barrier between the buttons, and the hand. The shirt sleeve may act as a barrier; though bacteria can attach to the user's shirt sleeve.

Disposable rubber gloves may be effective, in blocking bacteria, and using the buttons sanitarily, though it may be inconvenient to carry, and use gloves. Anti-bacterial swipes can be used to eliminate bacteria on buttons, though the discarded wipes produce waste. Use of antibacterial hand lotion requires, the user to carry the lotion, and may dry out the user's skin.

A Phone Unable to Find or Operate Multiuser Public Devices
A user may not be able to operate multiuser public devices, with their phone, like, an elevator, because the phone is unable to connect with the elevator, have the elevators control panel shown on the phone's display, and or the have the control panel interact with the elevator, or interact with other elevators, or different elevators.

Multiuser public devices, like, smart toilets locations may not be shown on internet phone maps, which may make it difficult for a user to find the toilet.

Disadvantages
Ways to avoid bacteria on physical input buttons, used to operate a device, heretofore known suffer from several disadvantages:

a) Bacteria and viruses can be transmitted to users, who touch control panel buttons on a multiuser touch screen display.

b) A user needs to know where the devices locations are, and how to operate each different device, this may be may be a lot of learning, and information, for a user, to learn and remember.

c) A static electric discharge may be created as a user touches an input screen, or input button, which may be be hazardous in flammable environments.

d) A user may inadvertently touch a multiuser device's physical control panel, such as, a mid-air hospital door opener, having bacteria on it, while try to use the mid-air control panel. It may be the difficult to judge a finger's distance, from an input device while mid-air touch inputting, which may lead to the fingers inadvertently touching the device. An improved input device, being a phone, with map, which allows a user to operate a device, without touching the devices physical input buttons is needed.

SUMMARY

A map is shown on a phone's display. Different multiuser public devices, for example, elevators, or smart toilets, are shown on the map. When a user is close to the devices, the phone can operate one or more of the devices.

The device's control panel is down loaded to the device, when the user is near the device. The control panel is displayed on the phone. The devices displayed control panel allows a user to bypass touching a physical control panel for a device.

Avoiding touching physical control panels allows the user to avoid touching other users' bacteria on the control panels. The panel is opened manually by the user touching the devices displayed icon, or panel can be opened automatically, and displayed when the phone is near the device, like, at a distance of 15 meters.

The device sends the phone, information about the input's effect on the operation of the device, which the phone displays, such as, the different floor numbers, as elevator moves to a requested floor number.

The devices locations are shown on a map display on the phone, allowing the user to locate the devices. A computer route can use graphic displays to give directions. vocalization of the directions can be produced over a speaker in the phone, and connected to the computer.

The phone can connect to the device, using radio waves to connect through an internet, or by using radio waves, or using a combination of both.

Two Ways to Connect to the Device, Internet, or Radio Waves

The user locates the device on the map, and moves to it. At the device, the user touches the devices icon shown on the map. The device, and phone connect using radio waves, such as, Bluetooth or WIFI direct or thru the internet using cell phone radio waves of the phone, and a wire connection by the device to the internet. The phone downloads the device's control panel. The phone operates the device, with the control panel, by touch activation of the panel input icons.

The internet is used to allow devices, such as, elevators, self-serve store checkout payment machines, and smart toilets, to be operated by the smart phone.

The devices, and phone connect through the servers that are connected to the internet. The serves use location information from the phone, and devices to plot their locations on an internet map.

The phone, and devices locations are determined by using, location devices, such as, Global Positioning System devices GPS. The map's streets, buildings, phone's location, and devices locations are shown on the phone's displayed map. The displayed map allows the user, to find a chosen device.

Touch input into the interface, activates one of the operations of the device. The activated operation is sent to the device. The received operation activates a function of the device, which operates the device.

Users Avoid Contact with Bacteria

Users avoid contact with bacteria, which may be harmful bacteria, by operating the device, by using the phone, to display the devices interactive control panel. When they touch a button, there also touching the bacteria left on the button, from the last users to touch the button. Some of the bacteria left on input buttons may be harmful. The bacteria can be transmitted from the button, to the user's finger, and then to other people through touch, and to other input buttons. The user may touch their mouth, introducing the bactaeria into their t body.

The user can operate the device, without contacting bacteria which may be on the device's physical touch input buttons. The phone is connected wirelessly to the device. User Input into the phone's touch screen, influences the operation of the device Advantages There are multiple benefits to a user from using, a map to find a device, operate the device, with the device's control panel, which is down loaded from the map, manually by touch activation of the device on the map.

a) A user can avoid, contact with bacteria, and viruses on physical input buttons, by replacing the input buttons with, bacteria free, input buttons, and using touch to activate them.

b) A phone finds and operates devices can be in work place environments that have bacteria, to avoid bacteria, such as, hospitals. The phone may reduce the spread of anti-biotic resistant super bacteria, when used to operate hospital devices, such as, hospital elevators.

c) A phone finds, and operates devices that can be in flammable environments, to avoid static electric discharges, which may ignite flammable material in the environment.

d) A phone finds and operates devices can be used to reduce dust. Dust produced by typing on physical keyboards is reduce, which may be useful in dust free environments, such as, in semiconductor production areas.

e) The phone, map, and control panel are a complete system, the user doesn't need to learn to operate the differing devices different system, such as, atm buttons, or fast-food kiosk menu buttons. The system uses standardised user operations, to operate the different devices.

f) A phone automatically downloads a device's operating control panel, such as, an elevator control panel. The automatic download eliminates a step of pre-installing into the phone the device's menu, and allows users to operate new devices that used for the first time.

g) The phone, map, and control panel system actives a download, to a device, like, elevator panel due to the phone, and elevator being near each other.

h) The system allows the user to find a multiuser public device's location, in particular, an ATM and operate it, by viewing its location, and the phones' location, on a displayed map, and inputting into the atm's control panel.

i) The bacteria on the phone, is the same as the user's bacteria, there isn't bacteria on the phone that isn't the user's, the user's fingers avoid contacting other people's bacteria, which may be different bactaeria then the user's bactaeria, different bactaeria may be new to the user, which the user's immune system may need to neutralize, which may have a negative effect on the user's health, when contacting the devices input buttons.

There is a desire, to provide an improved phone, having a user interface. The improvement to the touch phone, is the connection of the phone, to different devices, a map showing the phone's, and device's locations, and the operation of the devices by the phone.

The system brings the phone to a new level of interaction, with the public devices, by allowing the phone to find and operate the devices like, finding and operating elevators.

The improvement allows a user to find and operate different devices, with the phone advantageously. The touch phone is improved, by the addition, of the ability to operate a device. The devices are improved, by being operated by the phone touch freely, which allow operation, by the user, free of contact with bacteria.

Using a phone's display to find and operate different devices, brings the future, of sanitary, fun, device input diversity, and safe user input, to the present now.

Multiuser public machines, are able to be found, and operated by a user with a phone. Still further benefits of the phone used to operate different devices, and the map to find them, will become apparent from a study of the following description, accompanying drawings, and claims.

BRIEF DESCRIPTION OF THE DRAWINGS—FIGURES

REFERENCE NUMBERS

Figure 1:
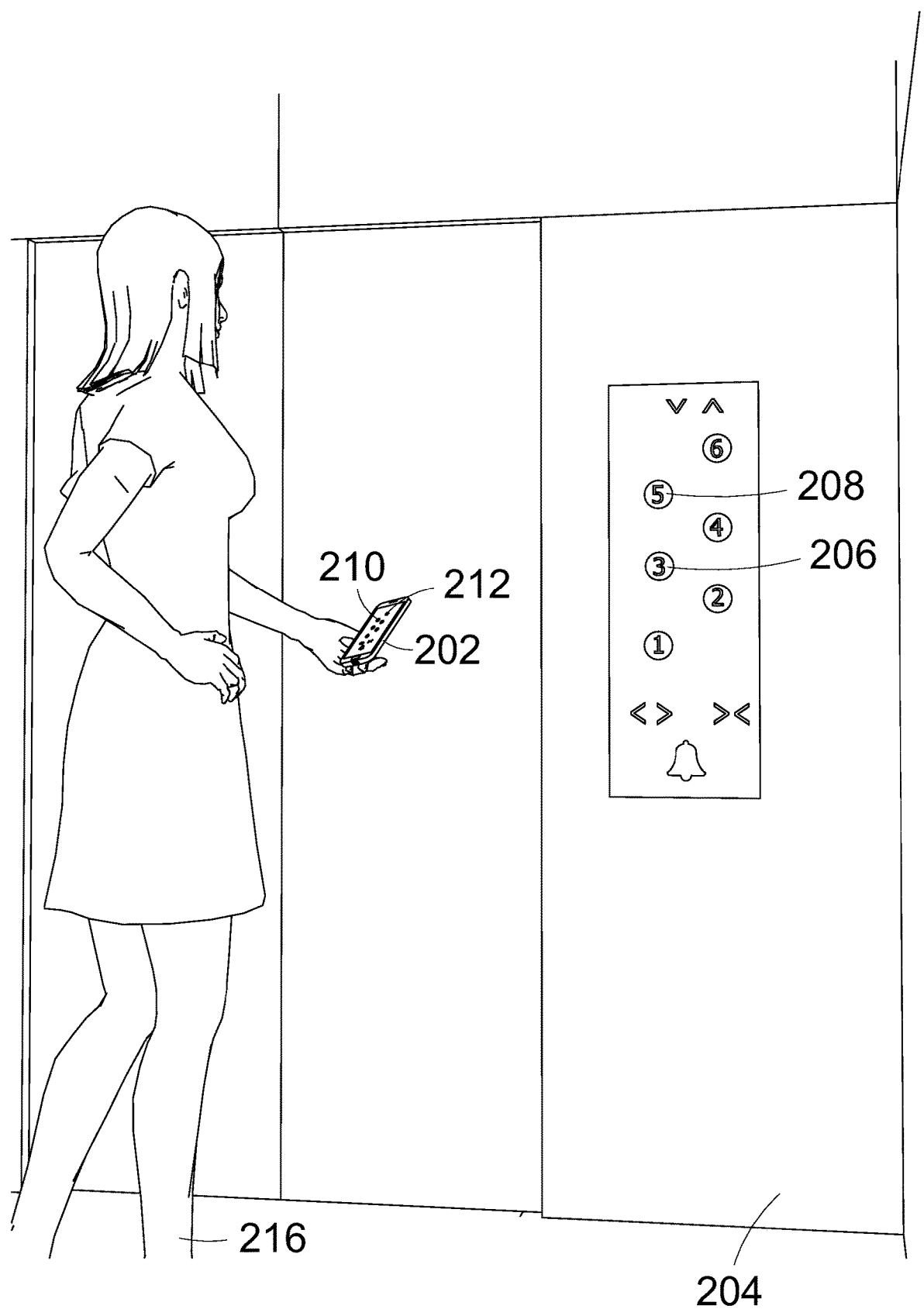
FIG. 1 shows a perspective view, of a phone used to operate an elevator, and the elevator.

104 phone
126 cell phone tower
144 smart toilet
148 medical device
150 microwave cellular connection,
154 a WIFI connection
156 local Area Network
158 Bluetooth radio waves
162 elevator
164 internet
168 server
202 phone
204 elevator
206 elevator control panel
208 elevator control panel commands
210 phone control panel
212 phone control panel commands
216 user
218 finger touching 2nd floor icon
302 phones
304 fast food restaurant menu display
306 display food menu control panel
308 display food menu commands
310 phone menu control panel
312 phone food menu commands
314 enter command display
316 user
320 enter button phone
602 phone
604 atm
606 atm control panel
608 atm control panel commands
610 phone control panel
612 phone control panel commands
614 enter ok command
616 user
618 amount
620 enter ok button phone
622 physical enter ok key button atm

DETAILED DESCRIPTION FIRST EMBODIMENT

A Self Driving Car's Control Panel Displayed on a Smart Phone Description

Finding a Self-Driving Car by Viewing the Self-Driving Car's Location on a Map

The user can find a car that drives itself, self-driving car's, location, on a displayed map, on a phone. The phone can be placed on the car dash board.

The phone has a global positioning system GPS, and the car has a GPS. The position of the phone, and car plotted on a map on the server, such as, an internet map. The map determines the distance from the phone, to the car.

The user finds the car, by viewing the car's, and phone's location on the map. The map can be an internet map which shows streets, and buildings, and environmental information. The user can move to the car, and view the phone icon's location moving, in real time on the map. The user can view their progress toward the car, as the map updates the phone's location on the map.

The touch screen has a route software, which augments the map, by showing a line, that is displayed on the map environment, and viewable by the user. The line is followed to reach the device. The route is pinned to the map environment, as the user walks, or cycles a bicycle, motorcycle, or rides in another self-driving car.

The route in the environment, is the same as the map route, and follows the route, that is displayed on the map. The user can follow the route line to reach the car's destination.

After Finding the Car

When the user finds the car, the phone connects the cars computer, when the user is within 14 meters to the car.

The user unlocks the car door, using the by transmitting the user's identify information to the car, and personal identification number PIN, or password. The user touches the car icon which opens a door unlock screen the user is asked on the screen for their pin number. The car icon A keyboard is partially displayed on the unlock screen, the user touches each number of the pin into the pin, in this case the user's pin is 7314. The user opens the car door, the user enters the car.

When the user is, inside the car, the user unlocks the cars locked ignition, by transmitting the user's identify information to the car, and personal identification number, or password. The user touches the car icon which opens a screen. Each of the car icons has a description associated to the icon, each description describes the icon that it is associated to, like, 5 passenger car.

The user is asked on the screen for their pin number. A keyboard is partially displayed on the unlock screen, the user touches each number of the pin into the pin, in this case the user's pin is 7314. starts the car. The user wants to go to a vending machine.

A control panel is displayed, by a phone's touch screen. The control panel shows different operations of the car. Each operation is activated by touch of the operation. Each operation describes a different operation of the car. The activated operation activates the operation of the car that the activated operation of the describes. The activated the operation of the car, influences the operation of the car. The influenced operation of the car is shown on the display.

The user touches the display, while holding the phone in their hands. The phone, and user are inside of the car. The phone is a portable computer, with a display, that connects to the internet wirelessly, and can make phone calls. The touch screen detects a user's fingers, when they touch the phone's display.

The display shows, car input buttons, such as, start car, stop car, a fan speed increase, or decrease, a heat temperature thermostat increase or decrease temperature, and an interactive internet map. Radio on or off, frequency modulation.

The phone computer connects to a global positioning system GPS device, in the phone. The map knowns the phones location. The map is used, for the user to request the car travel, to a chosen destination on the map. The map displays the cars location with a car icon on the map. The map can be used to find the car, by using the map to follow a route to the car.

The phone computer has car operating software, phone computer operating software, and touch screen operating software. The phone computer operates the car, or connects to car computers that operate the car, operates the display, and operates the touch screen.

The car computer and phone computer can connect to each other through an internet, with the car connected to the internet, and the phone connected to the internet.

The car icon is connected to an internet address of the car's control panel, user menu components. The car control panel to be sent over the internet to the phone, by the activation of the car icon. The phone operates the car over the internet with the panel.

Also, the connection of the car, and phone computers can be through radio waves, with the activation of the car icon, by the user, is associated to activating a request to send the control panel to the phone, by using radio waves. The phone operates the car by sending instructions, using the radio waves.

The computer has car operating software, computer operating software, and touch screen operating software. The computer operates the car, the display, and the touch screen. The phone computer communicates with the car computer. The car computer operates the car.

A Displayed Map

A map is part of the phone, with the locations of the phone, and device shown on it. The map is displayed on the phone display, with the locations, of the phone, and car. The map displays the relationship of the location of the phone to the car, and distance between them.

When the phone, and car are at a distance on the map, the device, and phone connect with each other through the internet. The car sends its virtual control panel to the phone. The control panel is displayed by the phone.

The user operates the car, by inputting into the car's control panel. The inputs into the car control panel, are sent to the car. The car uses the received inputs into its control panel, to effect, influence the operation of the car. The influenced operation of the car is sent to the phone. The phone displays the influenced operation of the car.

Car's Devices

The car's devices can include, a radio, climate control temperature, head lights, interior lights, ignition on or off, air fan speed, air venting defrost or feet warming, movies for passengers, computer games for passengers, engine temperature, oil warning light, and seat belt off warning.

The interface includes car device components commands, such as, radio station search, pre-set radio stations, increase or decrease radio volume, heat increase or decrease, fan speed increase or decrease, windshield wipers on, wiper speed increase or decrease, internet map, headlights on, and headlight low or high beam.

The radio icon interface includes, a graphic number station indicator, a sound volume indictor, a switch to another device switch, sound volume increases or decrease icons, and radio station change station increase or decrease icons.

The vehicle is equipped with, and connected to the car's computer, pedestrian or vehicle detection sensors, radar, and vehicle cameras and sensors (not shown).

Car instruments can be displayed by icons, such as, speedometer, engine revolutions, engine oil alert, and engine temperature alert.

The radio icon interface includes, a graphic number station indicator, a sound volume indicator, a switch to another device switch, sound volume increases, or decrease icons, and radio station change station increase or decrease icons.

Different Way the Cars Control Panel Can Be Uploaded to The Phone a) The cars control panel can be automatically uploaded from the car to the phone over the internet. The upload can be set to be distance activated, such as, the control panel uploaded when the phone is 24 meters from the car. The control panel shown by a short cut on the phone that describes the cars control panel. The touch activation of the short cut icon, displaying the control panel. The car is found by the map showing the phone's and car's location on the map. The map shows streets, and buildings.

b) The car's control panel can be manually uploaded from the car to the phone over the internet, by the user touch activating a car icon on the map. The car is then operated by the phone over the internet, with the touch panel. The car icon graphically, and or with word describing the car, so the user can identify what the icon represents.

b1) The touch activation of the car icon, activates an internet link to a download of the control panel to the phone, which downloads the control panel to the phone, and the phone displays the panel.

b2) The touch activation of the car icon, activates an internet link to a displayed web page, showing the car control panel on the phone. The user touch operates the car, by touching displayed operations commands for the car, on the web page. The web page shows information about the car, such as, how much gas in the car, if available for use, and if its reserved by other users.

b3) The touch activation of the car icon, activates a web page showing a touch internet link to a displayed web showing the car control panel on the phone. The user touch operates the car, by touching displayed operations commands for the car, on the web page. The web page shows information about the car.

b4) The activation of the car icon, activates a web page showing a touch internet link to activating an internet link to a download of the control panel to the phone, which downloads the control panel to the phone, and the phone displays the control panel. The web page shows information about the car.

c) The car's control panel can be manually uploaded from the car to the phone over the internet. By the user touch activating a car icon on the map. The car is then operated by the phone by using radio waves, with the touch panel. With the phone connected to the car with radio waves.

d) The cars control panel can be automatically uploaded from the car to the phone with radio waves. The upload can be distance activated, 46 meters, which is determined by the phone and car being within radio range of each other, such as, a Blue tooth connection established at 30 meters, or WIFI direct connection maybe 35 meters, from each other.

The uploaded control panel shown by a short cut on the phone, describes the cars control panel. The touch activation of the short cut icon displays, the control panel. The car is found by the map showing the phone's and car's location on the map. The map shows streets, and buildings.

e) The uploaded control panel is saved to the phone's storage. When the phone detects the car, by either distance on the map, or the automatic connection using radio waves, the icon short cut in the phone, shows the car's control panel, is available for touch activation.

The activated control panel and car each have a unique identifying computer code, that allow the car computer, and phone computer, to assure the control panel, is the right control panel for the car, and is used for the matching car and phone with each other. If the control panel doesn't match the car, the control panel won't function with the car.

The car computer, and phone computer can each have their data encrypted, to limit other users from viewing their communication, to limit hacking of the car or phone, and to limit operation of the car by other users' phones.

f) The car control panel is activated from its saved space in the phone's storage, when the user touch activates the car icon on the map.

The activation of the car icon activates the computer to check in the storage to see if the control panel for the car is there, if it is, it uses the stored control panel, and doesn't download the control panel. The control panel isn't downloaded again, and or doesn't over write the same stored control panel.

The car and phone can communicate with each other, either over the internet, with radio waves, infrared light waves, or a combination of the communication ways, like, transmitting over the internet, and receiving using radio waves.

On the map the car can graphically, and or with words show that its available to be operated by a phone Connecting Through Different Company's Servers 1. The devices, and phones can connect to each other, through different company's servers, with the different servers connecting to each other thru the internet. 2. The devices, and phones can connect to each other through a single company's servers. 3. The devices, and phone can connect to each other through both, the many of the devices, and phones connected to different company's servers, and with many of the devices, and phones connected to one company's server. With the one company's servers connected to many other companies' servers. With the different servers connecting to each other thru the internet Voice Recognition A microphone is connected to the computer and positioned to detect the user's spoken words. Words spoken, by the user, can activate the displayed icons.

The user can verbally, input one of the input icons, device location icons, or letters of the display menu, by verbally describing one or more of the displayed input icons, or letters. Voice recognition software in the computer, detects the icon being described, such as, saying increases volume, activates a sound volume increase icon. The sound volume increase icon is associated, to increasing a sound volume, of a radio in the car.

The phone having a map including the phone has a microphone and a voice recognition software, the phone detects voice names of devices, detected voice names of devices are inputted into the search function, the phone's detection of the user's voice description one of the displayed devices connects the described device to the phone, the displayed operations are activated by a detection of an operations voice command by the user.

Thought Input

A thought input device is worn on the user's head, and connects to the phone's computer, using radio waves. A thought input device software is in the phone's computer. The user uses their mind to think about, and highlight the command they want to activate, such as, the increase volume for a predetermined amount on time, such as, 0.4 seconds highlights the increase volume. At 0.6 seconds, of continuous though, and 0.2 seconds past the highlighting, the increase volume command is left clicked, and the increase volume icon is activated. The activated increase volume icon increases the volume of the radio in the car.

The phone has a brainwave software, and connects to the brainwave device worn on the user's head, devices are inputted into the search function using a search function thought command, the phone's detection of the user's thought description of one of the displayed devices connects the described device to the phone, the displayed operations are activated by a detection of an operations thought command by the user.

Eye Input

The phone has an eye gaze sensor, camera, that detects the gaze of the users at input icons on the phone, to activate the gazed at icons. The camera views the user's eyes. The phone's computer has eye gaze software.

The user looks, gazes at the phones display, a cursor follows the gaze point on the display screen, letting the user see what their gazing at. The user gazes at one of the icons for 0.1-0.8 seconds, and the icon is left clicked, and activated. A timer can be displayed, showing how much time of gaze is left, until the icon is activated.

User Finds a Car by Using a Map

The user can find a car's location, on a map. A touch screen phone is connected to a blue tooth or Wi-Fi radio device transmitter and receiver. A car's devices are connected to a blue tooth or Wi-Fi radio device transmitter and receiver device. The phone connects wirelessly to the car's devices, when the phone is within 5 meters or more to the car, and when the driver is in the driver's seat.

The car has software operating instructions icons, for the various functions and devices of the car. The car instructions are displayed on a menu by the touch screen.

The menu is on the phone's screen. The car's devices can include, radio, climate control temperature, head lights, interior lights, ignition on or off, air fan speed, air venting defrost or feet warming, movies for passengers, computer games for passengers, engine temperature, oil warning light, and seat belt off warning.

One icon displays an increase symbol, a second icon displays a decrease symbol, and a third icon displays a, toggle, or change car component symbol.

The phone's screen shows a user interface. The phone can be placed above the car dash board, and within distance of driver or passenger. The interface includes car device components commands, such as, radio station search, pre-set radio stations, increase or decrease radio volume, heat increase or decrease, fan speed increase or decrease, windshield wipers on, wiper speed increase or decrease, ground positioning system map, headlights on, and headlight low or high beam.

Internet Connection

The phone connects to the internet. While the car is driving to a destination, the user can surf the internet on the phone, view internet web pages, stream and watch movies, videos, tv, listen to music, internet radio, and play online internet games.

The car can have a car display, connected to the car computer. The car computer connects to the internet. The phone's display is cloned, shown on the car display. The phone operates the car display. While the car is driving to a destination, the user can surf the internet on the car display, view internet web pages, stream and watch movies, videos, tv, listen to music, internet radio, and play online internet games Car instruments can be displayed by icons, such as, speedometer, engine revolutions, engine oil alert, and engine temperature alert.

The radio icon interface includes, a graphic number station indicator, a sound volume indictor a switch to another device switch, sound volume increases or decrease icons, and radio station change station increase or decrease icons.

The vehicle is equipped with, and connected to the car's computer, pedestrian or vehicle detection sensors, radar, and vehicle cameras and sensors (not shown).

User Finds A Public Multi User Self-Driving Ride Sharing Community Share Car by Using A Map The user can find a public car's location, on a map. A touch screen phone is connected to a blue tooth or Wi-Fi radio device transmitter and receiver. A car's devices are connected to a blue tooth or Wi-Fi radio device transmitter and receiver device. The phone connects wirelessly to the car's devices, when the phone is within 5 meters or more of the car, and when the driver is in the driver's seat.

The car has software operating instructions icons, for the various functions and devices of the car. The car instructions are displayed on a menu by the touch screen.

The menu is on the phone's screen. The car's devices can include, radio, climate control temperature, head lights, interior lights, ignition on or off, air fan speed, air venting defrost or feet warming, movies for passengers, computer games for passengers, engine temperature, oil warning light, and seat belt off warning.

One icon displays an increase symbol, a second icon displays a decrease symbol, and a third icon displays a, toggle, or change car component symbol.

The phone's screen shows a user interface above the car dash board, and within distance of driver or passenger. The interface includes car device components commands, such as, radio station search, pre-set radio stations, increase or decrease radio volume, heat increase or decrease, fan speed increase or decrease, windshield wipers on, wiper speed increase or decrease, ground positioning system map, headlights on, and headlight low or high beam.

Car instruments can be displayed by icons, such as, speedometer, engine revolutions, engine oil alert, and engine temperature alert.

The radio icon interface includes, a graphic number station indicator, a sound volume indictor a switch to another device switch, sound volume increases or decrease icons, and radio station change station increase or decrease icons.

The vehicle is equipped with, and connected to the car's computer, pedestrian or vehicle detection sensors, radar, and vehicle cameras and sensors (not shown).

Software Flowchart

A software flow chart, for finding multiuser devices, includes, the self-driving car, with a phone, displaying a map on the phone, displaying a keyboard on the phone, typing a name for the devices into the keyboard, searching for the named devices, displaying the locations of the found devices, displaying descriptions of the devices, touching one of the devices, connecting the touched device to the phone wirelessly, sending descriptions of operations of the device to the connected phone, displaying the received descriptions of operations of the device on the phone, touching one of the operations, activating the touched operation, sending the activated operation to the device, influencing the operation of the device with the received activated operation, sending a description of the influenced operation of the device to the phone, displaying the received description of the influenced operation of the device.

Menu Help Instructions

A help icon labelled help can, be displayed, that when touch activated displays instructions on how to operate, the find and operate a device system, such as, explaining how to touch a device's icon to display the device's control panel, which displays its different operations which are touch activatable.

Phone Self Driving Car Operation

The phone has a holographic control panel input display, on the phone. The map shows the user's present location on the map. The present location is shown by a figure, such as, a circle.

The user touches a point on the map, for 0.2 to 1.4 seconds, and the touch creates a location, on the displayed map, that the user wants the car to move to. The move to location is highlighted with a visual, clue, such as, a dot, a flag, or a cursor point on the display. The user can move the dot to another location, by activating the dot to follow, the touch to the other location.

The map has a search icon. The activate search icon opens a search window. In the search window, is typed building addresses, names of business, names of locations. The found locations are displayed on the map.

The user can type in a start location, and a destination location, and different routes will be shown between the two locations. The user is shown one or more routes, to the desired location. The user touches the route the user desires. The displayed chosen route is highlighted. A start travel icon is displayed. The user touches a start travel icon, and the car operation starts travelling the route. A stop travel icon is displayed. The user touches at the stop travel icon, and the car parks safety out of the way of traffic.

A voice icon announces the phones location. A compass icon points to the north.

The smart phone has a touch screen display. The user can touch input, the displayed input icons for the self-driving car, by touching the icons on the screen. The user touches the start to destination icon, to activate the start to destination icon. The activated start to destination icon, signals the car's computer, to proceed to the location of the destination icon.

In another embodiment, a thought input device is wirelessly connected to the phone and connected to the computer in the phone. The user can also use though to activate the desired route. The user thinks of the route the user desires. The displayed chosen route is highlighted. The start travel icon is displayed. The user thinks of the start travel icon, and the car starts travelling the route. The stop travel icon is displayed. The user touches the stop travel icon, and the car parks safety out of the way of traffic.

If a pedestrian or vehicle is detected to close to the car, or on a course where the pedestrian or vehicle may contact the car, the pedestrian is highland on the display. The car automatically avoids contact with the pedestrian, object, or other car, by either stopping the car, or moving the car out of the way of the hazard. Hazard advance software is part of the car computer and uses artificial intelligence software to aid in hazard avoidance. The intelligence software learns to improve the cars obstacle avoidance as the car is operated over a time period.

If the computer doesn't avoid the hazard, the user may manually avoid it. The pedestrian or vehicle is viewable with a red flashing outline, halo around the pedestrian. The highlighting allows the driver, to act to avoid possible contact, with the pedestrian or vehicle. The user can look at the stop car icon to turn off the car in an emergency. The pedestrian or vehicle is detected by sensors, radar, pedestrian or vehicle cameras and sensors in the car (not show), which are connected to the computer.

The user can increase the volume of the radio, connected to the computer, by touching the volume increase operation icon, or decrease volume symbol of the radio by touching the decrease volume symbol icon. The user can view the volume of the radio on the volume indicator icon. The user can view a number icon of the radio station the radio is tuned to. The user can change the station, by touching the radio station change station increase or decrease icon. The user can switch between the radio receiving amplitude modulation AM, and frequency modulation FM radio waves, by touching the change car component symbol icon.

The user can turn on the head lights by touching the turn on head lights icon (not shown). The user's s contact with the light icon is detected by the touch screen, and connected computer. The computer activates the turn headlight on function. The computer sends instructions to the headlights switch to turn on the headlights. The light switch is switched to the on position, the lights are turned on.

The user can turn on the head lights by touching the turn on head lights (not shown) with their finger. The user's finger touch contact with the light icon is detected by the touch screen, and the connected computer. The computer activates the turn headlight on function. The computer sends instructions to the headlights switch to turn on the headlights. The light switch is switched to the on position, the lights are turned on.

The car broadcast radio waves that it is available to have its control panel menu down loaded. The phone receives the broadcast and downloads the menu. The touch screen displays the menu on the display. The phone and car are connected wirelessly and transmit and receive information with each other.

A user can set the phone, too automatically, or manually, connect to the car. When the phone connects to the car, the display menu for the car is transmitted to the phone. The received car control panel menu is display in for the user to view, and input in to.

The menu in the control panel is at a location which is touch accessible by the user when the user is near dashboard, such as, 0.5 meters in front of the user. The user touches the different input commands for the car, such as, turn on or turn off lights.

The user touches the command they want to highlight, and activate, to highlight the command they want activated. The user uses their touch to activate the command they want activated.

The user touches with their fingers at the command they want to activate, the command is clicked, by the touch9 and the command is activated. The user can active another command after the first command is activated. The user can active another command after the first command is activated.

The user can change the location that the input display is positioned. The display location can be a location which is convenient for the user.

When a car icon is activated, the car transmits to the phone, that the icon is activated. The car sends data about the status of the activated device, such as, speed of the car. The data sent from the car is displayed on the on the phone's screen display. The displayed data keep the user informed about the car's operation, and interaction with the user. The user can use the displayed car data to adjust the operation of the car, such as, changing the speed of the car.

If a pedestrian or vehicle is detected to close to the car, or on a course where the pedestrian or vehicle may contact the car, the pedestrian is highland on the phone's screen. The pedestrian or vehicle is viewable with a red flashing outline, halo around the pedestrian. The highlighting allows the driver, to act to avoid possible contact, with the pedestrian or vehicle. The pedestrian or vehicle is detected by sensors, radar, pedestrian or vehicle cameras and sensors in the car (not show).

Touch input of one of the icons, by the user's finger, inputs a request to the computer. The computer directs the car to carry out the input request of the user. For example, the user touch enters an input icon. The enter input is detected by the sensor and the computer. The computer directs the car use the light's high beams.

The input of one of the icons inputs the action, or command associated to the icon. The user touches the input area associated with the icon, when they touch at the icon. The computer receives the input, and activates the function associated to the input. The device associated to the function receives operating function instructions from the computer. The device's operation is affected by the computer instructions.

By using touch, for example, the user can increase the volume of the radio, by touching the increase symbol, or decrease the volume of the radio by thinking of the decrease volume symbol. The user can touch at the volume of the radio on the volume indicator, to view the radio's volume. To increase 1, or decrease the volume, the user touches the increase, or decrease volume symbols.

The user can touch the number the radio station the radio is tuned to, to change the radio station to the number the user desires. The user can change the station, by touching the radio station change station increase, or decrease icons, which increases, or decreases the station tuning number. The user can switch between the radio receiving amplitude modulation AM, and frequency modulation FM radio waves, by touching the change car component symbol, which will change to FM, or AM.

By using thought, for example, the user can increase the volume of the radio, by thinking of the increase symbol, or decrease the volume of the radio by thinking of the decrease volume symbol. The user can think of the volume of the radio on the volume indicator, to view the radio's volume. To increase, or decrease the volume, the user thinks of the at the increase, or decrease volume symbols.

The user can think of a number the radio station the radio is tuned to, to change the radio station to the number the user desires. The user can change the station, by thinking of the radio station change station increase, or decrease icons, which increases, or decreases the station tuning number. The user can switch between the radio receiving amplitude modulation AM, and frequency modulation FM radio waves, by thinking of the change car component symbol, which will change to FM, or AM.

When the change component icon is touched, it goes to the next component, and displays the components icon interface. Other components include, climate control heat, and head light brightness. The change icons image changes, to represent the competent is use, such as, a musical note symbol is shown when the radio is on, or a light bulb is shown when the lights are chosen for input.

The user can turn on the head lights by touching the turn on head lights icon (not shown) with their touch. The user's touch contact with the light icon, is detected by the touch screen, which is connected to the computer, in the phone, and the phone computer is connected to the car computer by radio waves. The computer activates the turn headlight on function. The computer sends instructions to the headlights switch to turn on the headlights. The light switch is switched to the on position, the lights are turned on.

The user can keep or remove different devices control panels, to lessen the number of control panels viewed, with touch. The icons can be used for different devices, by changing the components the icons are associated to. The change to another device switch of the input icons is used to switch or toggle between the different components. For example, the icons may be used in the operation of the radio, the user can switch their association to a next component, such as, the operation of a ground positioning system GPS map display, or the air heating system.

The icons can remain continually activated, or can be turned on and off, by the user using their touch to contact a turn off or turn on off icon (not shown).

Finding, and Operating a Multiuser Device with a Phone Map Description

A phone, has a touch screen sensor. The phone allows a user, to use touch, to activate input icons displayed on the phone's display.

The touch screen sensor, touch screen, tracks a user's touch, as they view the and finger's contact with the phone screen. The touch screen is positioned in the phone, to view the user's fingers. The user touches input icons.

The touch screen connects to a computer, in the phone. The computer is programmed, with a touch screen software, a phone, and touch screen software.

The phone uses the touch screen, to operate the touch screen external devices operating panel. The panel is displayed on the phone. The phone displays images, that the user touches.

The Icons Can Operate Different Functions

The icons can operate different functions, such as, an internet operation, a device operation, or computer operation. A browser input icon is used in internet operations, to display a search web page.

Input icons are displayed on the displayed web page, such as, an internet search operation. The search operation is used to search, the internet. The user types into the search operation, information requested by the user, and activates the search operation. The results of the search are displayed.

The icons show computer functions, such as, an 'enter' input, or command. A word document can be shown, that the user types words into, and edits the words.

The icons show device functions, such as, a toilet' icon, which is used as part of an electronic bidet in a toilet.

A Displayed Map

A map is part of the phone, with the locations of the phone, and device shown on it. The map is displayed on the phone display, with the locations, of the phone, and device. The map displays the relationship of the location of the phone to the device, and distance.

When the phone, and device are at a distance on the map, such as, 25 meters to 65 meters, the device, and phone connect with each other through the internet. The device sends its virtual control panel to the phone. The control panel is displayed by the phone.

The user operates the device, by inputting into the control panel. The inputs into the control panel, are sent to the device. The device uses the received inputs into its control panel, to effect, influence the operation of the device. The influenced operation of the device is sent to the phone. The phone displays the influenced operation of the device.

For example, the user is close to an automated teller machine ATM, like, 20 meters. An icon is displayed that the ATM can be operated, on the map. The atm icon is activated by touch. The atm control panel is displayed on the display. The control panel displays inputs, such as, deposit, withdrawal, a 1-10 number pad, enter, change, and cancel, etc, can be touch activated.

The user inputs a deposit input, using touch. The deposit screen is displayed. Touch inputs 11 dollars, by touching, at the numbers 1100 on the number pad consecutively. Touch activates the enter input. The 11 dollars of currency is deposited, and accepted by the atm, and the acceptance is displayed by the phone. The user ends the session with the atm, by using touch, to activate a log out input.

The Device Displayed on the Display with a Short Cut Icon

A short cut icon on their phone, displays the device that can be activated, by the activation of the icon. The short cut describes the device, graphically, and or with words. The device maybe the closest device to the phone. The device displayed by the icon as the closest device changes.

The Control Panel is Saved to the Phone

The control panel is saved in the phone's storage. The next time the device's control panel is activated, the control panel is activated form the storage.

Updating of Device Control Panel

The phone communicates with the device, to see if the stored control panel is up to date. By seeing if it's the newest version of the panel. If the device has a newer version of the panel, the newer version is downloaded to the phone, replacing the less new version. The less new version is sent to the delete folder. The new version is used to operate the device.

User Finds the Car

The user can find a self-driving car's location, on the map. After finding the car, the user enters the car. When the user is, inside the car, the phone connects wirelessly to the car's computer.

The user wants to go to a vending machine. The user types vending machines in the maps search area and enters, the vending search. The phone searches of vending machines on the map. The vending found on the map are shown.

The user choses one of a multiple of displayed vending. The user touches an icon representing the chosen vending on the map. The user's touch of the icon, actives the vending icon. A displayed directions icon is activated. The activated directions show different routes to the machine. Touch then actives a chosen route. The user touches at a displayed start car route icon. The route icon is activated.

The map can show the vending's location, in a building, and shows a route to the vending in the building. For example, the vending is on the number 2nd floor, routes are shown, to either take the elevator, or stairs to reach the vending on the 2nd floor.

The Device May not be Connected to the Internet

The device may not be connected to the internet. The non-internet device is shown on the map. The user finds the device by following a route on the map to the device.

The non-internet device connects to, and communicates with the phone wirelessly, using Bluetooth, or WIFI direct.

The phone receives the devices control panel from the device. The phone operates the device with the received control panel.

In another embodiment, the devices control panel can be received over the internet, by touch activating the devices icon on the map, or device icon on the display. The received panel is sent to the phone over the internet, and the phone operates the device using radio waves.

Manual Connection to a Device by Phone

The phone connects to the device, thru the device's web page. The devices on the map have an internet link to a control panel for the device.

The device's location is shown on the map, with an icon representing the device. A name, or description, which describes the device's icon, such as, smart toilet, or elevator.

The icon is activated by touch. The activated icon shows a map window. On the window is displayed an internet link, to the device's control panel. The window can give more information about the device, such as, how many users are using the device.

The link is described as, the devices control panel. The link is touch activated, and the control panel for the device is displayed. The control panel show different imputable operations for the device, with input icons. The user operates the device, by activating the input icons, with touch.

The link is connected to an internet address for the device. The device's internet address is managed, by the server that the device is connected to. The device connects to a router. The router connects the server that its specific to the device. The devices web page is managed, and or stored on the device's server. The device has a device computer. Information from the device is sent to the phone, and information from the phone is sent to the device.

The web page gives visual feedback, on how the activated functions of the device, influences the operation of the device. The phone receives, and displays feedback, from the device, concerning the influence the activated device operation, has had on the device.

With some device icons, the activation of the icon, can open the control panel for the device, without showing the link of the device in a window. The devices on the map have the internet link, connected to their icon, is a short cut to the link. Activating the one of devices icons, displays the control panel for the device.

Down Loading the Devices Control Panel and Operating the Device with Bluetooth Radio Waves The device's web link is activated. The devices control panel is downloaded to the phone, over the internet. The downloaded control panel is displayed with an input icon short cut to the control panel. The icon visually identifies, that it is an icon for the device. The icon is activated, and the control panel is displayed. The phone connects to the device using Bluetooth or WIFI. The user activates the device's control panel input icons using touch. The activated icon operates the device.

Single Network for the Devices, and Manual Connection

The devices can use a single network. The manual connection procedure of the phone, to devices can be used. The devices connect to the phone, on servers of a single network, that can be operated by a company. The devices are connected to the network's servers. The network displays the map web page. The devices web pages, and devices information are stored on the network's servers.

The phone connects to the network map, and devices over the internet. The phone operates the devices by communicating with the devices thru the network's servers.

Map Search for Devices

The user can zoom into and out of the map, with touch. The map is a graphic representation of the area, with written descriptions, such as, streets, street names, buildings, names of points of interest, like, self-driving cars, parks, stores, restaurants, metro stations. The map can be a picture view, such as, an internet street view, of the user's phone, and devices locations.

Devices Shown on The Map

Devices that can be operated by the phone are shows at their locations, on the map, such as, self-driving cars, elevators, and store checkout pay machines. The devices can be identified, with a symbol or colour, to let the user visual identify the devices as being operable by the phone.

The map can be searched for devices, with a search map engine. The user can search for devices on the map, such as, smart toilets, gas station gas pumps, with the search results shown at their locations on the map.

The server that the phone is connected to, connects to the server that the device is connected to. The device, and phone communicate thru the connected servers.

The device can limit the distance that the device can be operated, such as, 20 meters. If more than one user is using a single user device, for instance, at an ATM, the first user uses the device. The users are assigned a number in line, each user is shown the number, of their location in the line to use the ATM, such as, the number 3.

If the device is a multiuser device, like, an elevator, the first user's input, effects the operation of the elevator. The first user to input a floor number, is inputted, then the next detected user to input floor number, so the detected inputted floor numbers are recorded, and displayed consecutively.

Finding the Device by Viewing the Device's Location on The Map

The phone has a global positioning system GPS, and the device has a GPS. The position of the phone, and device plotted on a map on the server, such as, an internet map. The map determines the distance from the phone, to the device.

The user finds the device, by viewing the device's, and phone's location on the map. The map can be an internet map which shows streets, and buildings, and environmental information. The user can move to the device, and view the phone icon's location moving, in real time on the map. The user can view their progress toward the device, as the map updates the phone's location on the map.

The touch screen shows a route, which augments the map reality, by showing a line, that is displayed on the map environment, and viewable by the user. The line is followed on the map to reach the device. The route is pinned to the map environment, as the user walks, drives an automobile, or cycles a bicycle, motorcycle, or self-driving car.

The route in the environment, is the same as the map route, and follows the route, that is displayed on the map. The user can follow the route line to reach the device's destination.

Example of A Touch Screen with An Input Device Operating an ATM

The user touches the ATM with the name of the bank that operates it on the map, us an icon with a graphic symbol. By touch activating the icon, the name of the ATM, a description, of the services that the ATM provides, such as, deposit or withdrawal, the hours of operation, and its address, is displayed.

Devices can be shown such as, self-driving cars, elevators, vending machines, and store checkout payment stations. Each device is connected, to one of many servers. Each server is connected to the internet. Each device has an internet address, that is unique to the device. Each device has a web page that is specific to that device. The web page for one of the device's, displays the devices control panel. The page is interactive with the user. The user can operate the device, by touch, activating commands or different operating functions of the device displayed on the web page. The activated displayed operating function activates, is associated to activating, the operation of the device that is described by the operating function.

Phone Connecting to the Devices Through the Internet

The phone uses radio waves, to communicate wirelessly, with the devices. The phone can communicate with the device through the internet. The phone has a cell phone transmitter and receiver, for connecting to a cell phone tower.

The device connects to an internet router, either wirelessly, or wired. The device internet router connects, to a server for the device. The device server connects to the internet.

The phone connects to a cell phone tower. The tower connects to an internet router for the tower. The tower router connects to a web server for the tower. The tower web server connects to the internet. The device server connects to the tower web server, over the internet.

The device's server hosts the devices web page. The device, and phone each, have a unique IP address (Internet Protocol address) to identify each other, over the internet. The addresses can be an IP address using IPv4 or IPv6. The Internet Protocol (IP) is the principal communications protocol in the Internet. A security software in each the phone, and device. can secure the connection between the phone, and device.

The device, and phone may both use their own internet service provider ISP, to access the internet. The ISPs may be part of an internet exchange.

The phone, and device communicate with each other over the internet, using internet protocol language. The communication between client, and server takes place using the Hypertext Transfer Protocol (XHTTP), The communication can use MQTT which is a protocol for machine-to-machine and Internet of Things deployments. The communication can use CoAP which is aimed at one-to-one connections.

The IP address identifies the host, or its network interface, and it provides the location of the host in the network, and the capability of addressing that host.

The phone, and device each have a unique DNS (Domain Name System). The DNS turns the phone, and device domain names into unique Internet Protocol (IP) address. The phone, and device each have a communication software.

The phone can connect to the internet, by connecting to a cell phone tower, with the cell phone tower network connected to the internet. The phone, and or device, or both broadcasts, on their respective servers, their availability to connect with each other. The phone broadcasts, it's availability to connect to the device, and the device it's availability to connect to the phone.

Automatically Connecting A Device to A Phone by Using Radio Range, Or Distance Determined on A Map A window on the phone, shows the device's sent control panel. The panel can be shown as a small closed window, which take up 28 percent or less of the display, or a large open window, which take up 64 percent of the display, or 28 to 100 percent.

The small closed window, is opened by touch activating the window, which also enlarges the control panel, where the panels inputs are large enough to be activated by touch. The open large window, is displayed as being already open, with the panel's inputs being large enough to be activated by touch.

The device, and phone search for each other. The device detects phones, that are broadcasting their ability to receive, the devices control panel. The phone detects devices, that are broadcasting their ability to send, the devices control pane to phones. The phone may connect to the device first, or the device may connect to the phone first.

Ways of Connecting the Device to The Phone

Radio Wave Connection

The device, and phone connect, when in radio range of each other, when either device detects Bluetooth radio wave frequency's, of the other device. The detection of Bluetooth radio, detect may depend on the range of the device, and phone from each other, such as, 20 meters, in unobstructed view, or 10 meters when physical barriers, like, walls between the device and phone interfere with the radio signal.

The device, and phone scan Bluetooth radio wave spectrum, until find a radio identifier from the other device is detected. Each device, and phone have their own address identifier, that shows, that it's control panel, is available for download.

Radio Wave Connection to the Internet Connection

The device, and phone are each connected to the internet. The device connects to the internet, thru a wired connection, or radio wave connection that connects thru a wifi router, that is connected to the internet, using wifi radio wave, or connects to 4g or 5g radio waves that connect to cell phone network that allows connection to the internet. The phone connects to cell phone towers, with 4g or 5g or 6g radio waves.

The device, and phone each connect to their own server on the internet, or to the same server on the internet. The servers connect to each other, thru the internet, connecting the devices. A map can be on a server, or on the device, or phone, maps the location of the phone, and device. When the device, and phone are a specified distance, of like, 10 meters the map connects the device, and phone to each other.

When connected, the device sends, the phone, the device's control panel. The panel is displayed on the phone. The elevator's panel is sent to the phone. The user touches panel input buttons, that phone operates the device, with the panel, like, activating an operation of the elevator, for example, touch activating the floor number 2, which requests the elevator move the elevator second 2 floor, which operates the elevator to move to the second 2 floor.

Storing Control Panel on Phone

The control panel received by the phone, is saved on the phone. After the panel is saved, after the first down load, the next time the device, and phone connect, the device asks the phone, or the phone tells the device, communicates whether the phone has the device's control panel, and if the panel is the most recent, up to date panel.

If the device, and phone detect that the phone has the panel, the panel isn't sent to the phone, and the phone operates the device with the panel that is stored in the phone storage, by displaying on the panel on the phones display. If the phones panel isn't the latest panel the device sends the phone, the latest panel, which the phone stores, over riding the latest up to date panel in stored in the storage.

Finding and Operating a Public Multiuser Device with a Phone Map Operation

The touch screen detects where the user, touches the screen. The touch screen detects, when the user touches one of the displayed icons.

For example, the user touches, the enter input. The enter input is activated. The activated enter input is used, to enter an input, for the phone, or web page, or device.

A signal that the icon has activated, is sent to the device, to operate a function of the device. The device receives the signal to operate the function of the device. The device uses the received function signal to operate the device.

The phone receives, and displays feedback, from the computer in the phone, concerning the influence the activated computer function, has had on the phone computer. The phone receives, and displays feedback, from a computer in the device, concerning the influence the activated device function, has had on the device.

Phone Operation of a Smart Toilet

The user can use the phone, to control a smart toilet's electronic bidet. The user's touches the bidet icon, they want to activate. Touch of the icon activates the icon. The activated bidet icon signal is sent to the bidet device, to operate the bidet.

The touch screen detects the user's touch, at the bidet's increase water temperature icon. The timer starts in the phone, at the detection of the touch, at the temperature icon, the detection of continued touch, at the temperature icon, the icon is activated.

The phone sends, the bidet the activated increase water temperature icon function. The bidet receives, the increase water temperature icon function. The increase water temperature function influences the operation of the bidet. The water temperature of a water stream from the bidet, is increased.

The phone receives information from the bidet, that the water temperature has increased. The received water temperature increase is displayed, on the screen, and is viewable by the user.

The smart phone has a touch screen display. The user can touch input, the displayed input icons for the bidet, by the icons on the screen.

The user touches the increase water temperature icon, to activate the increase water temperature icon. The activated start to increase water temperature icon, signals the bidet computer, to proceed to the increase the bidet's water temperature.

Software Flowcharts a) A software flow chart, of touch detected by the touch screen for activating input icons, includes, input icons are displayed in, by an phone, touch is detected at one of the icons, that the user desires to activate, by touch screen in phone, input icon is activated, activated icon activates phone computer, or web page, or device function, associated to activated icon, activated function is sent to associated phone computer, or web page, or device, phone computer, or web page, or device uses activated function to influence it's operation, the operation of the phone computer, or web page, or device is influence by the activated function, feedback about the influenced operation of the phone computer, or web page, or device is sent to the phone computer, and the operation received by phone computer, or web page, or device influenced operation is displayed.

b) A software and hardware flow chart, which includes, a phone having a map, the map displaying devices that are used by multiple users, comprising, the map has a search function, the phone has a keyboard connected to the search function, an activation of the search function displays on the map locations of devices whose names are typed into the search function by a user's input into the keyboard, each of the displayed devices has a description associated to the device, each description describes the device that it is associated to, the phone's detection of the user's finger's contact with one of the devices connects the contacted device to the phone, the connection of the phone to the device activates a sending of the device's control panel from the device to the phone, the received control panel is displayed on the phones display, the control panel displays operations of the device that are different from each other, the displayed operations describe operations of the device, detection of the user's finger with one of the displayed operations activates the displayed operation detected being contacted, the activation of the displayed operation is associated to an activation of an operation of the device that is described by the displayed operation, the activated operation of the device effect's the operation of the device, feedback about the effected operation of the device is sent from the device to the phone, the received effected operation of the device is displayed on the phone.

Alternative Embodiments

Finding and Operating Different Devices Description

User Finds a Device by Using Map

The user can find a device's location, on the map. A phone uses a touch screen sensor, to track a user's touch. The touch screen is positioned in the phone, to detect the user's fingers, as the user touches input icons, displayed three on screen.

The touch screen is connected to a computer, in the phone. The computer is programmed, with touch screen software.

The phone, displays images on a display, cover by glass that the user touches. The images create an optical view for the user. The input icons, menu items, control panel, graphical user interface, are displayed three dimensionally, and or two dimensionally 2D.

Connection Between Phone and Devices

Figure 7:
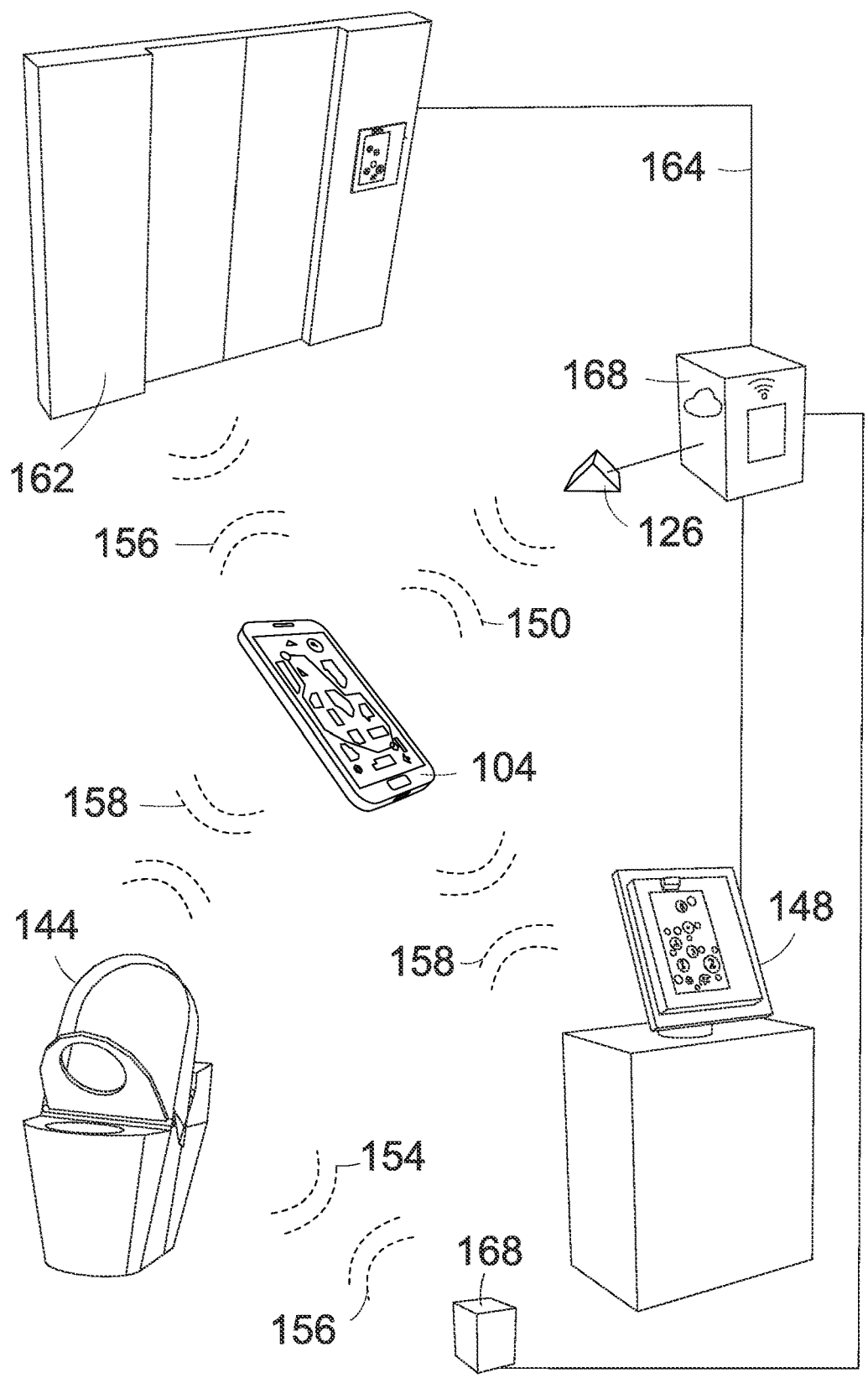
FIG. 7 shows a perspective view, of a phone, the phone's wireless connections to different devices, including, a smart toilet, medical device, and elevator.

The phone may connect to and communicate to differing external devices, as illustrated in FIG. 7. The phone uses a radio wave connection between the phone, and the differing devices, and or an internet connection between the phone and the differing devices.

The phone can connect to devices, with the phone having a wireless connection to the internet, which can include, microwave cellular connection 150, to cellular towers 126, a WIFI connection 154 over a local Area Network (LAN) 156, Direct WIFI, Infrared light, and Bluetooth radio waves 158.

The phone having radio wave transmitters, and receivers for each radio connection system. The devices having radio wave transmitters, and receivers for each radio connection system.

The phone and the devices can also communicate using infrared light. The phone having infrared light wave transmitters, and receivers. The devices having infrared light transmitters, and receivers.

The phone can connect to the internet, thru a WIFI router 168. With the phone router being connected a phone server, and the phone server is connected to the internet.

The devices can connect to the internet, thru a router 168, and modem. The device router being connected a device server, and the device server is connected to the internet. The devices can use a wireless, WIFI, or wired connection to the router.

The phone, and device can connect to cell phone towers 126 using cell phone radio waves, or microwaves 150. The phone can access the internet, thru the phone's connection, to the cell phone towers.

The devices that connect to the phone 104 can connect to the phone having a wireless or wired connection to the internet, which can include, microwave cellular connection, to cellular towers, a WIFI connection over a local Area Network (LAN), Direct WIFI, Infrared light, and Bluetooth radio waves. The phone having radio wave transmitters and receivers for each radio connection system. The devices may include an elevator 162, the smart toilet 144, and a medical device 148.

Establishing a Connection Between Phone and Devices

The phone broadcasts that's its available for communication with a device, as illustrated in FIG. 7. The phone searches for devices that are broadcasting, that they are available to communicate with the phone.

The device broadcast that's its available, for communication with the phone, and searches for phones that are broadcasting that they are available with the phone. When the phone, and device are in radio wave connection range with each other, they connect, and communicate with each other.

External devices broadcast their control panels, to different phones. More than one phone can operate a device, such as, many user's phones can input into the elevator control panel, at the same time.

When the user's phone, is near the external device. The external device's control panel icon is shown on the phone's display. The control panel icon indicates that the external device's control panel, it's available for downloaded to the phone computer.

When the external devices control panel is activated, the external device's control panel is download, to the phone's computer, and is shown on the phone display An Internet Connection Between the Phone and Device The phone can connect to external devices using the internet 164, as shown in FIG. 7. The device broadcasts over the internet that its available for operation.

The phone computer's location can be found using the phone's global positioning system GPS, or phone cell phone location, etc. The phone can be located on an internet map. The map includes the external devices locations on the map. The devices, such as, a vending machine can communicate with the phone, connecting with phone using an internet connection, using internet communication, and communicating over the internet.

The phone can be located on the map. The map shows the plotted locations, of the different external devices' locations. The phone, and devices each has a location software that allows them to know each other's location on the internet map.

The phone's computer, and external devices location can be tracked and plotted, on the internet map, to determine when the phone is near the devices. The map is displayed and viewed by the user Storage The computer readable medium may include non-transitory computer readable medium, for example, such as computer-readable media that stores data for short periods of time like register memory, processor cache and Random-Access Memory (RAM). The computer readable medium may also include non-transitory media, such as secondary or persistent long-term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

These computer program instructions may also be stored in a computer-readable medium that can direct a computer or other programmable data processing apparatus, to function in a manner, such that the instructions stored in the computer-readable medium produce a function of a device, including instructions which implement the function act specified in the flowchart and or block diagram block or blocks.

The computer program instructions may also be loaded onto a computer, or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram.

Computer

The computer in the external device, is used for processing, and implementing the information received from the phone, concerning the user's operation, and input of the device's operating menu on the phone. The received user input information, by the external device, is used in the operation of the external device.

The computer may further include on-board data storage, such as memory coupled to the processor. The memory may store software that can be accessed, and executed by the processor, for example. The host may be any type of phone computing device, that is configured to transmit data to the device. The host and the device may contain hardware, to enable the communication link, such as processors, transmitters, receivers, antennas, etc.

Communication Links

The phone may connect to the device, locally, over a network, or at a distant location over the internet. In the communication link is illustrated a wired connection, however wireless connections may also be used. For example, the communication link may be a wired link via a serial bus such as USB, or a parallel bus. A wired connection may be a proprietary connection as well. The communication link may also be a wireless connection, such as Bluetooth, IEEE 802.11 or other wireless based communication links. In another example, the system includes an access point through which the device may communicate with the internet. In this example, the device may not require connectivity to the host.

The access point may take various forms. For example, if the device connects using 802.11 or via an Ethernet connection, the access point may take the form of a wireless access point (WAP) or wireless router 168. As another example, if the device connects using a cellular air-interface protocol, such as a CDMA or GSM protocol, the access point may be a base station in a cellular network, that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, GPRS, CDMA, EV-DO, and/or HSPDA, among others.

The device may be configured to connect to access point using multiple wired and/or wireless protocols, such as "4G" or "5G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internet through the host.

Phone Connecting to the Devices Through the Internet

The phone can communicate with the device through the internet. The phone having a cell phone transmitter and receiver, for connecting to a cell phone tower. The phone connects to a phone server 168 on the internet thru the tower.

The device connects to an internet router, either wirelessly, or wired. The device router connects to a device server, on the internet. The phone, and device each have a, compatible communication software. The phone server connects to the device server, over the internet.

The phone has a global positioning system GPS, and the device has a GPS. The position of the phone, and device are plotted on a map on the server, such as, an internet map. The map determines the distance from the phone, to the device.

The phone, and or device, both broadcast on their respective servers, their availability to connect with each other. The phone broadcasts that's it's available to connect to the device, and the device broadcasts being available to connect to the phone.

When the phone, and device are at a distance, of 30 meters, on the map, the device, and phone connect with each other through the server. The device, or user manually request the device send its virtual control panel to the phone. The control panel is displayed. The user operates the device, by inputting into the control panel. The inputs into the control panel, are sent to the device.

The device uses the received inputs into its control panel, to effect, influence the operation of the device. The influenced operation of the device is sent, to the phone. The phone displays the influenced operation of the device.

Many Devices Control Panels Displayed by Phone

Many different external device's software, for device's control panels, can download the to the phone's computer. The different devices, which are available to be operated, can be shown on the display. The user can input, which device they choose to operate.

Phone can Connect to Many Device Simultaneously

The phone can operate more than one device at a time. Two devices operating menus can be shown, on the display. The user can input into the operating menus consecutively, such as, the user can operate a vending machine, then operate the room lights.

Programming

Computer program code for carrying out operations of the object detection, and selection mechanism may be written in any combination of one or more programming languages, including an object-oriented programming language such as Java, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Software

The phone and device use a compatible software language, a standardized software language, a communication software language to communicate with each other. The devices each have a computer, with a microprocessor connected to a storage. The computer in the phone is used for processing, the operation of the downloaded device control panel.

The phone, and external devices, have the computer communication software, that allows them to communicate and operate, with each other. The software allows for the transference, download of operating panel displays, from the external devices to the phone.

Operation Flowchart

The object detection and selection mechanism are described below with reference to flowchart illustrations and or block diagrams of methods, apparatus (systems) and computer program products according to implementations thereof. It will be understood that each block of the flowchart illustrations, and or block diagrams, and combinations of blocks in the flowchart illustrations and/or block diagrams, can be implemented or supported by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive A software flow chart, of touch detected by the touch screen activating input icons, is described, and includes, input icons, cursor is displayed on display by phone, cursor's location is associated to user's touch point's location, on the display, cursor moves with touch point, touch screen detects the user's touch at input icons, activation of input icons, are associated to activation of computer functions of the phone, the internet, or functions of a device connected to the phone, user touches at icon to activate icon, cursor contacts icon, icon is highlighted as touch continues at icon, the icon activates, the activated icon, activates the computer function, or device function associated to the icon, the activated computer function, or device function, influences the operation of the computer phone, or device, and the phone receives, and displays feedback, from the computer, or device, concerning the effect of the influence on their operation.

Block Diagram of Connected Components

A block diagram of the connections, between the hardware components of the phone, computer, device, or internet, is described, which includes, touch screen positioned in phone, to view user's fingers, touch screen connected to computer in phone, and phone wirelessly connected to device, or internet.

The Phone Computer can be Used to Store Software

The phone can keep and store the software which was downloaded from the device, to use with the device the next time the device is operated. The device can have a unique identifier, which is associated to its operating software. The identifier can be used for the phone to identify the device, and use the stored software for the operation of the device.

The software can be stored in a profile of user settings, which are associated with the user, and or the elevator.

The Phone Computer can be Used as Computer for a Device

The computer in the phone, can be used as the computer, which is used to operate an elevator. Other devices that the phone computer may operate include, smart toilets, and automatic teller machines ATMs.

User inputs into the ATM, may include, login pin number, deposit input, withdraw input, checking account selection, and menu, inputted by the user, the computer in the phone connects to the device, and is programmed with software for the device it operates.

The phone computer can have preprogramed software to operate different devices, such as, elevators, vending machines, medical device, and self-serve gas pumps.

Finding and Operating Different Devices Operation Examples of Phone Used to Operate Multiple Devices, Including, An Elevator, A Smart Toilet, And A Store Checkout Machine Elevator A user approaches an elevator 162. The phone connects to the elevator, as illustrated in FIG. 7.

The elevator's input icons are displayed on the phone's screen. The user's touches at one of the elevator icons, the icon highlights, a timer is activated, and the icon activates.

The activated elevator icon activates the elevator's control panel to be displayed. The control panel shows an up button, or down button input icons. The user touches an up button of the menu, and the up-button illuminates, and the elevator is called to the user's floor.

The user gets on the elevator, and a menu for the inside of the elevator is displayed on the phone's screen. The inside menu shows, floor number options, I, 2, 3, 4 floor numbers, and open door, etc.

The user touches at the 3-floor button, and the button is activated, and the elevator moves to the 3 floors. The user stops the showing of the displayed menu on the phone's screen, after using the elevator Smart Toilet Example The user operates a smart toilet, having an electronic bidet. The bidet's operating menu is displayed. The menu shows input icons, whose functions are associated, to operations of the toilet. An activated icon input operates, the associated toilet device. The menu shows input options such as, front wash, back wash, water temperature settings warm water, water pressure, water pressure increase, or water pressure decrease.

The user uses touch 106 to activate, a back wash setting 142, a warm water temperature setting, and increases the water pressure, and a start icon.

The bidet starts the directing of warm water, at the user's back position. The toilet's display shows, the operation of the toilet.

Self-Serve Store Checkout Machine Example

The user goes shopping at a store. The user gets potato chips, and oranges. The user checks out, at a self-serve check out payment station. The cost of the products is displayed, on the phone's screen.

To pay for the products, the user touches their debit card, credit card, or electronic commerce company account, to open the payment system. The user inputs their personal identification number, or password, using a displayed keyboard, or number keypad, and touches the desired letter, or number.

The user opens their electronic commerce account, and transfers funds from their account to the machine. The machine accepts the funds. The machine shows, that the user has paid for the products.

Phone Touch Used to Avoid Bacteria on A Public Door Opener Switch for Disable or Bacteria Avoidance Users The phone may reduce the spread of anti-biotic resistant bacteria, when used to operate devices, such as, door opener switches, by using touch on the phone's screen. The user doesn't need to touch the control surfaces of the devices, to operate them.

The surfaces may have bacteria, or viruses on them. The bacteria can be transferred to the user's fingers, infecting the user, and possibly causing illness. Touch operation of the door opener switch on the phone's screen, limits the viruses on hands, which limits the number of viruses transmitted from hands to surfaces, and from hands to other people.

The door opener switch is wirelessly, connected to the phone. The door opener switch control panel, has input icons, and is displayed on the phone's screen. The icons include, door open.

The touch screen detects the user's touch, of the open icon. The open icon is inputted, by the detection of the user's touch at the open icon. The door is opened, by the input of the open icon.

Reduced Possibility of Static Electric Spark when Operating a Flammable Vapor Environment Device When the user's phone, is near a flammable environment device. The phone wirelessly detects the device and communicates, with the device. The device control display panel icon is downloaded, to the phone's display. The downloading of the icon indicates, that the device is available for operation.

The phone may connect to, and communicate to different external devices, using a radio wave connection between the phone and the differing devices, and or an internet connection between the phone and the differing devices.

The user sees a flammable environment device icon, with a description of the device, associated with the icon. The user activates the icon with touch. The activated icon displays a control panel menu. The menu includes icons showing differing functions, associated with operations of the device.

The user operates the device by using touch to activate differing icons, associated with differing functions of the device.

The phone control panel can reduce, the problem of static electricity, in a flammable vapor environment. The user may create a static electric discharge, between the user's finger and an external device's display panel. The electric discharge may ignite, air borne flammable vapor or material. Since The phone is in the balanced electrical field of the user, an is less likely to produce static electric discharge by touching the phone's screen.

Using touch to operate the device, reduces the need to touch the physical external device display, to operate the device. Using the phone in flammable environments, may be aid in reducing the chance of ignition of air borne flammable vapours or particles.

Airborne flammable vapor or particles may be present in the air, in locations, such as, silos with grain dust, petroleum refineries, and paint plants. The flammable environment devices, may be operated by the phone, which can operate an on or off switch for, a gas compressor, an elevator, and operate a computer keyboard.

Static electricity being the result of an imbalance between negative and positive charges in an object. These charges can build up on the surface of an object until they find a way to be released or discharged.

Devices Activated by Touch Input Icons Associated to The Device

Public interactive device may include electronic devices, such as hotel doors locks, space station devices, flammable environment devices, elevators, and space station devices.

Automatically Display Device Control Panels

The control panel can be operated independently of the device's location, for example, an elevator call control panel, can be operated 5 meters for the elevator control panel, and out of view of the physical panel. The user can call the elevator, using the call panel. Some devices could rely solely on the panel for operation, without having a physical touch screen input control panel.

Many devices menus can be displayed which are near each other, such as, a vending machine menu, an elevator call button, and an automatic teller machine, etc., in the same room.

Vending Machine,

A vending machine menu displays food, chips, drinks, candy for sale. The user touches, the displayed chips icon. The touched chips icon activates. The user pays for the chips, by opening their electronic commerce account, and transferring funds from their account to the vending machine. The machine accepts the funds and delivers, the chips.

The user can also pay, the vending machine, with funds having been downloaded to the phone, and which are displayed on the phone, and are touch inputted, and sent to the vending machine.

Space Station Devices

In a space station's dry air environment. The user may create a static electric discharge, between the user's finger, and a physical display panel, that is used to operate a device. Static electric discharge is reduced, by not touching the physical input panel. Touch allows a device, to be operated without needing to touch the physical display panel. Since the phone is in the electrical field of the user, an is less likely to produce static electric discharge by touching the phone's screen.

A space station's devices could include, a variety of devices, such as, a space station robotic operating arm control panel, with some inputs to move the arm left or right or up or down. A displayed option, to operate the arm left-handed, or right-handed by the user, can be inputted with touch. A space station toilet, medium toilet water temperature setting, can be displayed and inputted.

The phone's operation is a universal mobile input device, for operating different devices. For example, a space station phone can operate, the space station moving arm, and then in a different input configuration, the phone can operate a station camera mover. The phone operates many devices, without the need of having two, or more different physical input devices.

The phone can save space, by allowing to the control panel to be virtual, without need for a physical control panel. The phone can have control panels, for different devices, saving the space needed for the physical different panels.

Gas Pump

The user uses the interactive input display, to operate a gas pump. The user can activate the pump's input icons, by touching the displayed icons. The user touches the gas pump input icons, to choose the octane of gas, or pay for the gas. The activated icons, are displayed, are associated with the operation of the pump, and activate gas pump functions, such as, delivery of gas, or payment of the gas. The phone receives feedback information, while the device is operating, such as, how much gas is being pumped.

Door Lock in A Hotel

The phone screen can show a door unlock options, yes, or no. Using touch to activate a yes, wirelessly signals, the door to unlock, in a Motel. The lock could also use a pin number, to unlock the lock. Touch entering the pin number, would unlock the door. With the door unlocked, the user has the option of touch locking the door using a shown, lock door on the display.

Public Microwave Oven in A Convenience Store

The phone operates a microwave oven, using the displayed operating microwave oven operating menu, on the phone, such as, cooking time, and heat power setting percentage.

Automated Teller Machine ATM

An ATM display input panel appears. The panel shows a menu, of the ATM's operations, that can be activate by touch.

The phone receives feedback information, while the device is operating, about the ATM, such as, the amount of funds deposited, account balances.

With more than one ATM, the ATMs physically show numbers, that correspond to ATM numbers on the phone display. The user chooses the numbered ATM, such as, 1, and activates the same displayed number 1, associated ATM icon.

The activated ATM icon input operates, one of the functions of the ATM. ATM functions include, user cash deposits, cash withdraws, and other banking transactions.

Machine in a Dust Free Environment

Touch input may be beneficial, in a dust free environment, such as, microprocessor fabrication environments. The phone doesn't have moving parts. Physical key boards have moving parts, whose movement may create friction, which can create dust.

The friction causes particles from both surfaces to detach, from the surfaces, and become airborne. The particles then descend to a surface, which creates dust on the surface. Dust on the surface of a microprocessor, may have a negative impact on the microprocessor's production.

A phone keyboard is displayed in the dust free environment. A on off switch is displayed. The phone is connected, to a microprocessor fabrication machine.

The touch screen is used in the dust free environment to input into a control panel, to operate a device in the environment.

The user touches the different icon button inputs. Each button is associated to a selection, of one of a variety of operations of one of the devices, in the dust free environment, such as, the computer, or microprocessor fabrication machine. The user chooses an icon, such as, the enter, or space icon to select the desired device operation. The user can turn the device on or off, by touch inputting, the either on or off icon.

Finding and Operating a Door Opener for Disabled Users with a Map on a Phone Description A Phone Map Displays door openers A phone has a displayed map. The map has a search window. The map shows the floor that the user is on, a floor map of the of the floor. The building has a building compute, or the door opener has a computer, the door opener is part of the building. The door opener computer, may control one or many door openers in the building, and communicate with many different users' phones, activating an opening of one or more doors, at a time, simultaneously. The phone connects to the building computer.

Typed search results for devices, like, door opener for disabled users, show displayed icons associated to the door opener s, at locations on the map, that are associated to the locations of the door opener s. The lights icons visually describe pictorially, or in writing the lights, such as, a drawing of a door opener or the word I door opener for the door openers.

A route function is displayed, that when touch activated, plots a route from the phone to one of the door opener s. The route follows hallways, stairs, and routes inside a building housing the door openers, that are accessible by walking. The user can active the door openers when they are in the same room as the door openers, or in a different room than the door openers.

Opening a Door

When one of the door openers icons is touched, the icon opens, the control panel, of the icon. The control panel displays door opener open door control panel.

The touch activated command, sent from the phone, sends instructions to the building computer, like, touch activating the activation of the door opener, which opens the door, sends instructions to the building computer, to open the door. The received door open signal by the building computer, activates the building computer, to open or send power, to the motor that opens the door, upon which the door is opened. After a time period, for instance, in 1 minute the door closes.

Finding and Operating a Door Opener for Disabled Users with a Phone Map Operation Route Inside the Building Inside the building, the user follows the route, on the map of the building, to the door opener. The map includes, the route on a 1st floor, and stairs to take to the floor that the light is on, such as, 2nd floor. Once on the 2nd floor, the map shows a 2nd floor map with route to one of the I door openers.

Example of Door Operation

When the user and phone are close to the door opener, like, 10 meters. The door opener's icon, on the phone is activated, by touch by the user. The activated door opener icon activates, the displaying of the door opener's control panel.

The user touches the door opener open icon on the panel, on the phone, and the door opens. If two doors are side by side, one an exit door, and one an entrance door. A gps sensor on the phone, and triangulation with cell phone towers, and wifi receivers, and transmitters, are used to determine the user's location, of being inside the building or outside of the building. If inside the building the door says exit door open, which when activated opens the exit door.

Or both doors can be displayed, with open commands for each door. The user picks the door that they want to open, activating either the exit, or entrance door command, or open command for the door. Bacteria is avoided by avoiding touching a physical door opener button switch, when using the phone to activate the door open switch.

Finding and Operating a Vending Machine with a Phone Map Description

A phone has a displayed map. The map has a search window. Typed search results for devices, like, vending machine, show displayed icons associated to the devices, at locations on the map, that are associated to the locations of the vending machines.

The vending machine icons on the phone visually describe pictorially, or in writing the vending machine, such as, a drawing of a vending machine, or the word vending machine is spelled.

Vending Machine Product Choices

Displays commands include, pay with wallet, potato chips, corn chips, chocolate bar, water, cherry gum, cookies, hot dog, pizza, popcorn, sprite soda, coke, pretzels, cake, cheetos, mints, and ice cream.

Finding and Operating a Vending Machine with a Phone Map Operation

Finding the Vending Machine

The user types in vending machine, in the search window, using the virtual key board. Vending machines that are available for operation, by the phone are displayed. The displayed vending machines show a description, the phone, of the vending machine's products, such as, like, chips, soda, ice cream, candy, coffee, pizza, hamburgers.

Route Inside the Building

Inside the building, the user follows the route, on the map of the building to the vending machine. The map includes, the route on a 1st floor, and stairs to take to the floor that the vending machine is on, such as, 2nd floor. Once on the 2nd floor, the map shows a 2nd floor map with route to the vending machine.

Example of Vending Machine Operation

The user picks one of the displayed vending machines, from many vending machines. The user touches the vending machine icon that's say chips, to open the machines control panel.

The panel displays, potato chips, chocolate bar, water, cherry gum, cookies, hot dogs, pizza, popcorn, sprite soda, coke, pretzels, cake, cheese chips, mints, ice cream. The user touches the potato chip icon, and the price for the chips is displayed. The user touches the wallet pay icon and pays with a digital wallet on the phone. The chips are delivered for the user to retrieve.

Finding and Operating a Smart Toilet with a Phone Map Description

A Phone's Location and Smart Toilet Is Displayed on An Internet Map on The Phone Smart toilet is typed into the search window. Smart toilet locations are plotted and displayed on the map. The displayed Smart toilets are shown as icon representative of the smart toilet. Different fastest routes from the phone's location to the smart toilet, are displayed on the map, when the user touches the smart toilet that they want to go to. The user can follow one of the routes to reach the smart toilet.

Routes are shown a building with the toilet, and route inside of the building housing the toile. With the routed mapped, plotted to a map of the inside of the building. The user follows one of the routes to the smart toilet. The phones display screen is a touch screen display.

An activated displayed icon command activates a smart toilets operation associated to the icon command, for example, touch of a smart toilet icon command activates the command being touched, for example, activation of a displayed increase water temperature icon, activates the increase water temperature operation of an electronic bidet in the smart toilet, the increased water temperature operation increases the water temperature of the water flowing from the bidet.

An activation of a decrease water temperature icon activates, the decrease water temperature operation of the bidet in the smart toilet, the decreased water temperature operation decreases the water temperature of the water flowing from the bidet. The commands can be displayed as being on a scale of 1-10, with 10 being the highest temperature.

An activation of a back-wash icon activates, the back-wash operation of the bidet in the smart toilet, the back-wash operation directs water flowing from the bidet at the user's back elimination position, anus. An activation of a front-wash icon activates, the front-wash operation of the bidet in the smart toilet, the front-wash operation directs water flowing from the bidet at the user's front elimination position, female bladder opening.

An activation of a decrease water pressure icon activates, the decrease water pressure operation of the bidet in the smart toilet, the decreased water pressure operation decreases the water pressure of the water flowing from the bidet. An activation of an increase water pressure icon activates, the increase water pressure operation of the bidet in the smart toilet, the increased water pressure operation increases the water pressure of the water flowing from the bidet.

Other commands associated to an operation of the bidet, and the operations description, include oscillating water spray pattern, and pulsating water spray, increase or decrease the time of the front or back wash with a displayed clock, warm wash, hot wash, cool, wash, start, stop, bottom dryer temperature increase, bottom dryer increase air flow.

The Smart Toilet Sends Information to the Phone

The smart toilet sends information to the phone, about the operations of the toilet, which is displayed on the display, such as, water temperature, water pressure, time until the water being sprayed ends, the time left for the front wash.

The displayed data keeps the user informed, about the toilet's operation, and interaction with the user. The user can use the displayed toilet data, to adjust the operation of the toilet, such as, touch increasing the time of the front wash, decreasing the waters pressure, decreasing the waters temperature, and changing the oscillating water spray, water spray pattern, and pulsating water spray, Touch Screen Input The user can input, using the touch screen, one of the input icons, letters, words, and written phrases, of the display menu.

The user touches, with their finger, the icon command they want to activate, such as, touching a front wash input icon, the front wash input icon command is highlighted, the icon is left clicked, the icon command is activated, the front wash operation of the bidet is activated, and bidet washes the user's front of their posterior. The user can active another command, after the first command is activated.

The routes show a route for the toilet, to the build with the toilet, and route inside of the building housing the toile. With the routed mapped, plotted to a map of the inside of the building. The user follows one of the routes to the smart toilet.

Users Waiting to Use the Smart Toilet

If the smart toilet is being used by another user, the smart toilet puts the user in line for using the smart toilet, and assigns the user a number, like, a number 2 in line. The number 2-line assignment is shown of the user's phone. The smart toilet allows for one operator of the smart toilet at a time. With multiple smart toilets, each smart toilet is assigned, a number, or letter, or designation for each smart toilet, like, 1, 2, 3, or a, b, c, d. The user touch chooses the smart toilet that they want to use, from the display smart toilets.

The phone using the locations devices, like, gps, radio waves, to determine which toilet the user is occupying. The toilet and phone can also automatically display the toilet's control panel, for the toilet in the toilet stall that the user has entered. The automatic panel displays the panel with the letter associated to the toilet the user is occupying.

The chosen smart toilet sends the user's phone the control panel for the chosen smart toilet. The panel shows the toilet associated to the panel, namely, the letter d toilet. Each smart toilet has a control panel that is specific, to the smart toilet, and operates that specific smart toilet.

The phone's computer directs the smart toilet's computer, to carry out the input request of the user. For example, the user touches the back-wash icon. The back-wash input is detected by the sensor and the computer. The phone's computer directs the smart toilet computer, to start a bidet backwash.

Finding and Operating a Smart Toilet with a Phone Map Operation

Finding the Smart Toilet

The user connects to the internet thru the mobile phone network, or thru a WIFI connection. The user types in smart toilets in the search window with on the virtual key board. Available smart toilets that are available for operation, by the phone are displayed. The displayed smart toilets show a description, of the smart toilets, such as, the time of operation.

The user touch chooses, one of the smart toilets, and chooses to have directions and routes shown to the smart toilet. The user follows one of the routes to the building with the smart toilet.

Inside the building the user follows the routed on the map of the building to the smart toilet. The map includes a 1st floor, and elevator to take to the floor that the toilet is on, such as, 3rd floor. Once on the 3rd floor the map shows a 3rd floor, map with route to the toilet.

The routes include the time to the smart toilet, by car, waking, and public transportation, bus, or subway. The directions and routes are displayed.

When the user is close to the smart toilets, like, 20 meters. The smart toilet icon is activated by touch by the user. The smart toilets control panel is displayed on the display. The user chooses the letter d toilet. The d toilet d control panel is displayed with the letter d displayed, on the panel.

Example of Toilet Operation

The user touches the front wash icon, the warm wash icon, the low-pressure icon, start icon. The bidet directs water to the user's front position. The user touches the increases temperature icon, and increase time, by 28 second. The water temperature is increased, and the time of the water being sprayed ins increased. The water stops when the displayed time is ended. The user touches the air dryer, which starts the air dryer. The user presses the stop button, to stop the air dryer, the air dryer stops. The user vacates the toilet.

The user uses touch to activate the input icons such as, a back-wash setting icon displayed on the phone's display, a warm water temperature setting, and increases the water pressure, and a start icon. The bidet starts the directing of warm water, at the user's back position. The toilet's display, shows the operation of the toilet, doing the warm water, and back wash operation.

Figure 3:
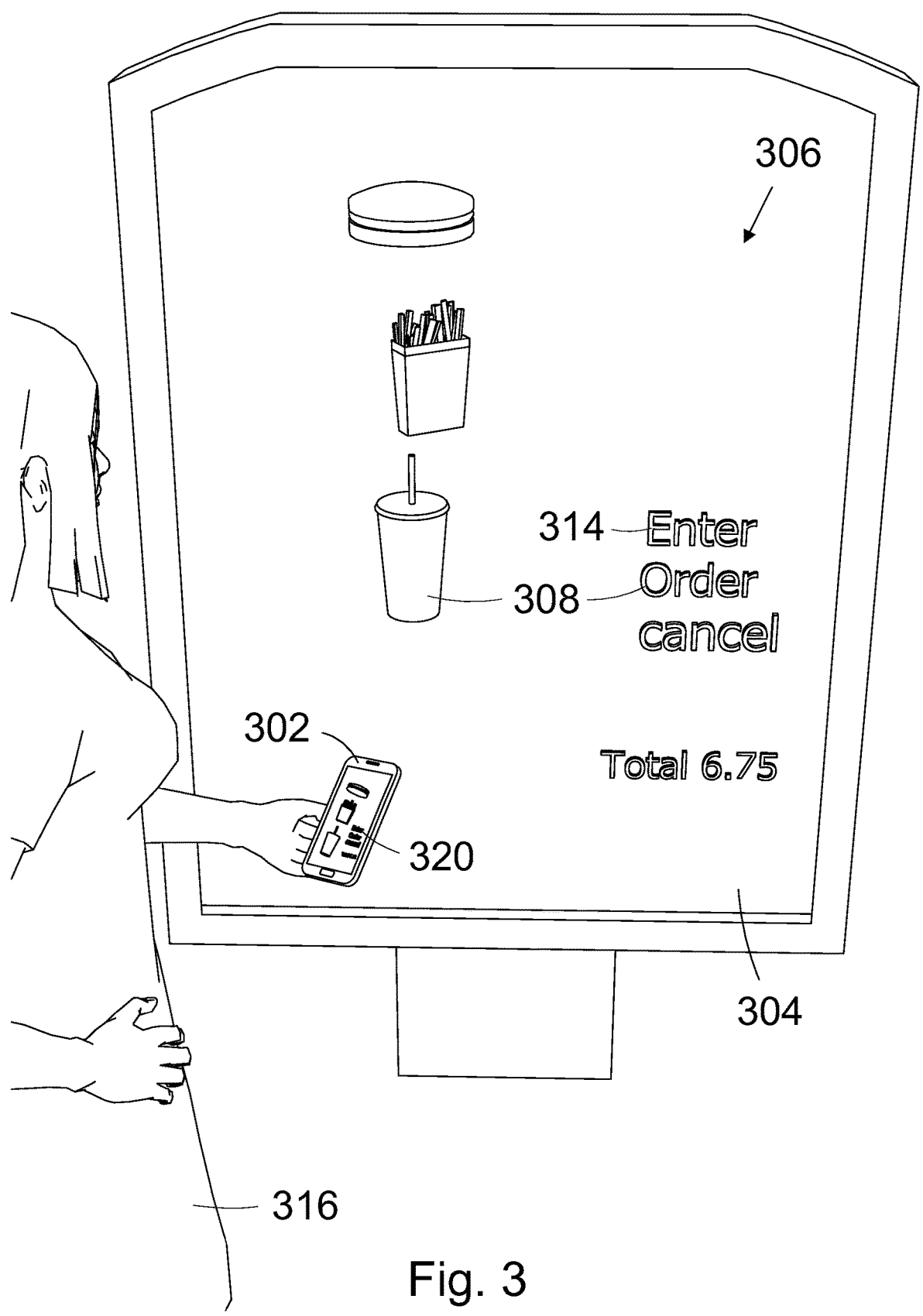
FIG. 3 shows a perspective view, of a phone used to operate a self-serve fast food display, and the self-serve fast food display.
Figure 4:
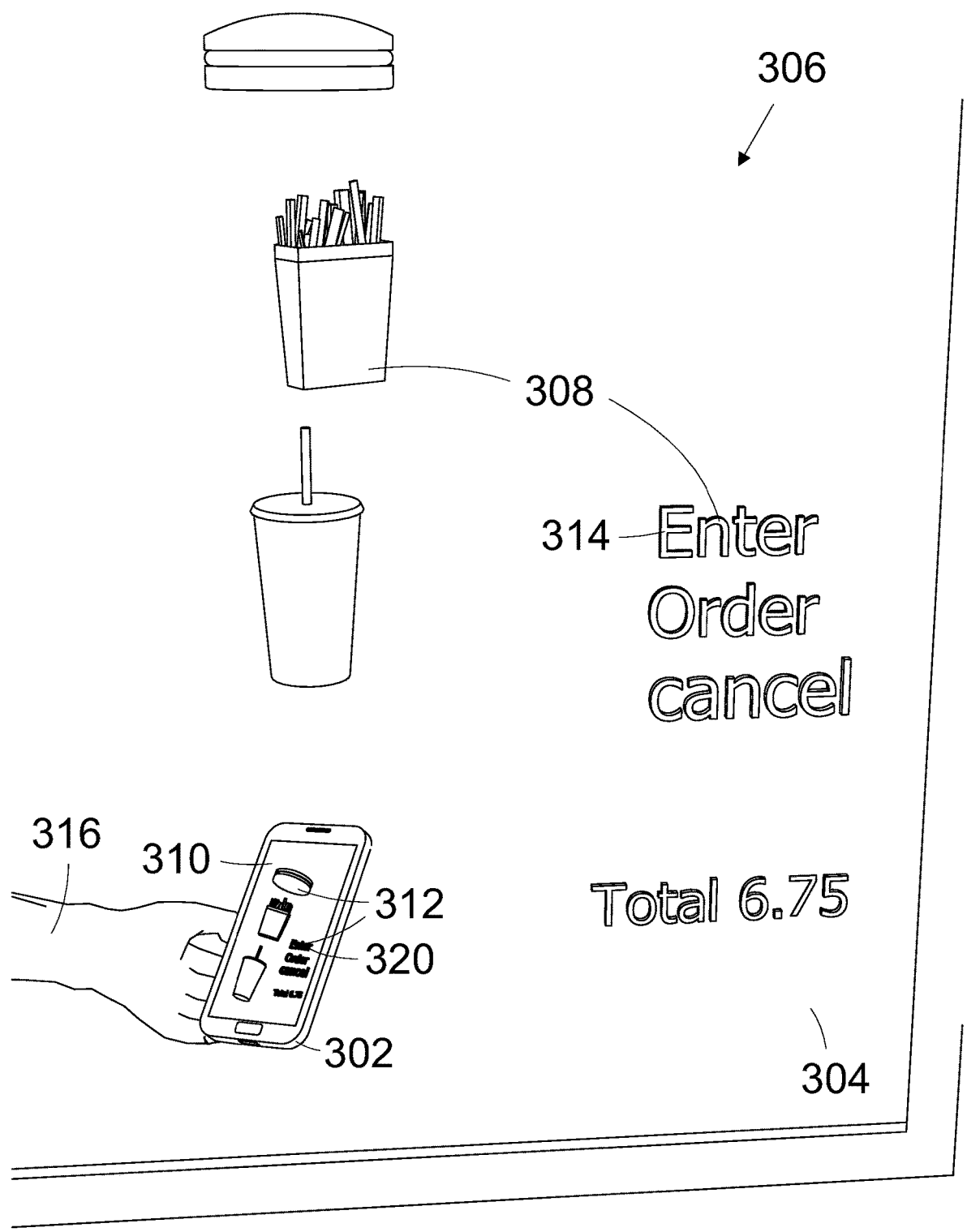
FIG. 4 shows a perspective view, of a self-serve fast food control panel on a phone, the self-serve fast food control panel, and the phone connected to the self-serve fast food display.

Fast Food Restaurant Self Order, Finding and Operating with a Phone Map Description A map has a displayed, search function window, as shown in FIGS. 3, and 4. A displayed keyboard is used to type into, the search function window. Searches for devices, that can be operated by the phone, such as, restaurant menus, can be typed, into the search function window. When the user looks at the map, the devices that the phone can operate are displayed, like, the restaurant menus.

When restaurants are typed into the search window, restaurant menus locations are plotted, and displayed on the map. The displayed restaurant menus are shown as icons representative of a restaurant menus.

A route function is displayed, that when touch activated, plots a route from the phone to the restaurant. Th route follows roads, and routes inside a building housing the restaurant, that are accessible by car, and or walking.

Connecting Phone and Restaurant

Touch of a chosen restaurant menu, signals the server to connect the phone 302 to the restaurant's computer, through the server. The phone asks the restaurant, for the restaurant display food menu control panel 306, which includes food menu commands 308. The restaurant can also automatically, send the panel to the phone when they connect.

The phone broadcasts and receives radio waves. The phone connects to the internet, or to the restaurant computer using radio waves.

Phone Displaying Restaurant Control Panel

The received food menu control panel 306 is displayed, on the phone. The panel shows icons that are available for the user to activate with touch, that will input the operations of the restaurant food menu commands. The touch activation of one of the displayed restaurant operation icon, signals the restaurant's computer, to activate the restaurant operation that is associated to the activated operation icon.

The Restaurant's Menu

The restaurant's menu, includes, hamburgers, cheese burgers, peperoni pizza, ham pizza, slice of cheese pizza, fried chicken leg, french fries, fried chicken breast, bean burrito, beef burrito, salmon sushi, scrambled eggs, hot dog, fried eggs, chili, chicken sandwich, fish sandwich, beef wrap, pork fried rice, shrimp and noodle, salad, egg breakfast, grilled cheese, pad thai, chicken chow mein, sandwich, salad with chicken, baked potato, meatball submarine sandwich, chicken soup, chocolate donut, coffee, ginger ale, coke, orange soda, 7up, milk, and bottled water.

Self-Serve Restaurant Payment

The display shows order payment menu input icons, that include, a cash payment, credit or debit card payment. A total products price amount area is displayed.

The user views the different input commands, on the display, such as, a ten-key number pad 1, 2, 3, 4, 5-0, amount of purchase, accept purchase amount, enter, and credit card number.

The user inputs numbers into the display pad, by individually touching one of the numbers, such as, a number 0. The numbers can be entered, to input a debit card, or credit card pin number into the computer. The input can be shown on the display.

A credit card can be stored on the phone. The phone can also store the user's financial account, such as, bank account, electronic commerce (e-commerce) company account, debit card, credit card account over the internet, and paying from the account. The computer inputs a PIN number, inputted by the user.

The payment information is displayed on the display can be used as, a self-serve checkout display, where the user checks out their own purchases. The payment display can also be, a served checkout payment display, where an employee of the restaurant, checks out the user's food or drink purchases, and accepts payment for the purchases.

The data inputted by the user 316 into the display, is displayed on the display. The displayed data keeps the user informed about the payment operation, and interaction with the user. The user can use the displayed data, to adjust the operation of the payment menu, such as, changing a personal identification number PIN number if a first number is incorrect.

Restaurant Employees Viewing the User's Order

The menu items touch inputted by the user into the phone display, are sent to the restaurant display. The restaurant employees view the user's order. The employees prepare the ordered food. The restaurant sends the phone a notification, that the order is ready. The prepared food can be picked up by the user, or delivered to the user's table.

Transference of bacteria from the payment station touch control panel is reduced, by using the phone menu control panel to order food.

Ordering with a Restaurant Food Order Kiosk with the Phone

The user can connect directly with the restaurant computer, and download and display the restaurant menu, and menu control panel. The user can also order food, by operating a restaurant kiosk with the phone.

Interaction with the Menu on the Phone is Shown, on the Kiosk's Menu

Interaction with the menu on the phone is shown, on the kiosk's menu, such as, a hamburger is ordered, which highlights it on the phone, the same hamburger, is shown as being ordered, and hight lighted on the display.

The kiosk's display 304, displays the fast-food restaurant menu display 306, which includes display food menu commands 308. The display menu, and display control panel is also displayed on the phones display. The kiosks displayed menu, is cloned to the phones display. The cloned kiosk menu, is displayed on the phone, as a phone fast food restaurant menu display 310, and includes phone food menu commands 312, and is interactive with touch of the phone menu, and phone menu commands. The kiosk's menu is interactive with touch of the menu, and menu commands.

By using the phone, to order menu items, the user avoids touching the kiosk touch input display, which may have bacteria on it.

Touch Operating the Menu Display

Each menu item has a picture icon, that is a picture of the item, such as, a beef burrito icon is a picture of the beef burrito, or a graphical representation the beef burrito. The menu food, and drink icons are inputted by touch, such as, the user touches the hamburger displayed on the phone, to highlight, and order the hamburger. The ordered hamburger, is put into an order associated to the user.

On the phone, the user touches the enter 320 commanded on the phone food menu commands, to activate the enter command. The enter command 314 is also displayed on the kiosk display. Items in the order can be removed by touch inputting the item in the order, which displays a check mark next to the item. The user touches a remove item icon, and the check marked item is removed from the order.

Restaurant Employees Viewing the User's Order

The menu items inputted by the user into the phone display, are sent to the restaurant display. The restaurant employees view the user's order. The employees prepare the ordered food. The prepared food can be picked up by the user or delivered, to the user's table. A number is assigned to the user's order.

Connections Between Phone and The Store Computer

The phone computer connects to the restaurant computer, which is connected to the kiosk. The restaurant computer connects to a restaurant employee display. The restaurant computer operates the menu, and payment menu.

The Kiosk Displays the Control Panel

The kiosk displays the control panel, and the operations on the kiosk, that is displayed on the phone. The same information displayed on the phone and the kiosk, reassures the user that they are using the same kiosk's control panel, menu as the menu show on the phone.

Manually Determining Which Kiosk, The User Wants to Use, Touching the Kiosk on the Display to Be Operated With multiple kiosks, each kiosk is assigned, a number, or letter, or designation for each kiosk, like, 1, 2, 3, or a, b, c, d. The number is displayed on the physical kiosk. The user views the physical kiosk's number, that they are in line to use.

The map displays the many kiosks, with each displayed kiosk displaying the physical kiosks number, that the displayed kiosk corresponds with. The displayed kiosks are positioned on the map, the same as the physical kiosks are positioned physically, this allows the use to visually identify the kiosks positions on the display, with the visual identification of the positions of the physical kiosks.

The user touch chooses the kiosk, that on the display, that is the same as the number, that they are in line to use, or vice versa. The user chooses the kiosk they want to use on the display and then get in line with the am that is the same as the number item that they have chosen on the display. For example, the user is in line for the number 3 kiosk, touches the 3 kiosk on the display, to display the 3-number control panel, or vice versa.

The kiosk line, the user is going to use, is assigned a number on the panel, and the same number on the kiosk, that the user can view. The user can also manually change the amt that they want to use, by touching a different kiosk.

Automatically Determining which Kiosk, the User Wants to Use

The phone using the devices locations, gps, cell tower triangulation, to determine which kiosk the user is in front of. When its determined which kiosk the user is in front of, the kiosk can send the phone the panel, and the phone can automatically display the kiosk panel for the kiosk that the user is standing inf front of. The automatic panel displays the panel with the letter, associated to the kiosk the user is occupying.

The kiosk can also use the facial recognition to identify the user, viewing the user thru the camera on the phone. The identified user is viewed, by a kiosk camera positioned to view users in front of the kiosks, to determine which kiosk the user is standing in front of. By using the facial recognition to identify the user in front of the kiosks, and then where the user is located.

The phones control panel is displayed for the kiosk, that the user is in line for. If the user changes lines, the control panel will change to the line the user is in.

Voice Recognition

A microphone is connected, to the phone computer, and positioned to detect the user's spoken words. Words spoken, by the user, can activate the displayed icons.

The user can verbally, input one of the input icons, or letters of the display menu, by verbally describing one or more of the displayed input icons, or letters. Voice recognition detects the icon being described, such as, saying enter, left clicks a displayed enter icon, and activates the enter icon. The activated enter icon is associated, to activating an enter function of the menu.

Fast Food Restaurant Self Order, Finding and Operating with a Phone Map Operation Finding the Restaurant The user connects to the internet thru the mobile phone network, or thru a WIFI connection, as shown in FIGS. 3, and 4. The user types in restaurants, in the search window, using the virtual key board. Restaurants that are available for operation, by the phone are displayed. The displayed restaurants show a description, of the restaurants, such as, the floors being used by the restaurant, like, 2nd floor.

The user touch chooses one of the restaurants and chooses to have directions and routes to the restaurant shown. The routes include the time to the restaurant, by car, waking, and public transportation, bus, or subway. The user follows one of the shown routes, to the building with the restaurant Example of Restaurant Operation The user uses touches the restaurant icon to activate, the start order icon. A menu is displayed. The items that the user orders are part of the order. The order is assigned to the user, with a number, or a picture of the user taken by a camera in the phone. The order is viewed by the employees.

The user uses their finger to activate the displayed icons, that they want activated. The user touches their finger on one of the displayed icon items, that they want to activate, such as the cheese burger input icon.

The cheese burger icon is clicked, and activated. The activated cheese burger item is put, on the user's order.

The user can active another icon command, after the first command is activated, like, fries, 7up soda, coffee, etc. Other commands include enter 320, cancel, change order which allows the user to delete, remove items put on the order. The change icon can also be used, to activate icons that are increase order size icons, like, make the drink a larger size, or fries to a larger size, extra cheese, or extra ketchup. Numbers 0-9 icons on a ten-icon pad, can be imputed for number of items, like, three 3 chicken sandwiches, or 2 strawberry milk shakes.

The user touches, contacts the ham pizza icon, on the display. The ham pizza icon is highlighted. The touched ham pizza icon is left clicked and activated. The activated ham pizza icon is associated, to activating a function of the computer, to have ham pizza, include in the user's order.

The user completes their order and touches, a finish and pay enter icon 320. The user pays with the credit card that is on the phone. The restaurant receives the paid order. The user waits for their order to be prepared. The restaurant sends the phone a notification that the order is ready. The user can pick up the order in the restaurant, or it can be delivered to a booth, or table the user is sitting at.

Finding and Operating an Atm with a Phone Map Description

A Phone Has A Displayed Map

Figure 5:
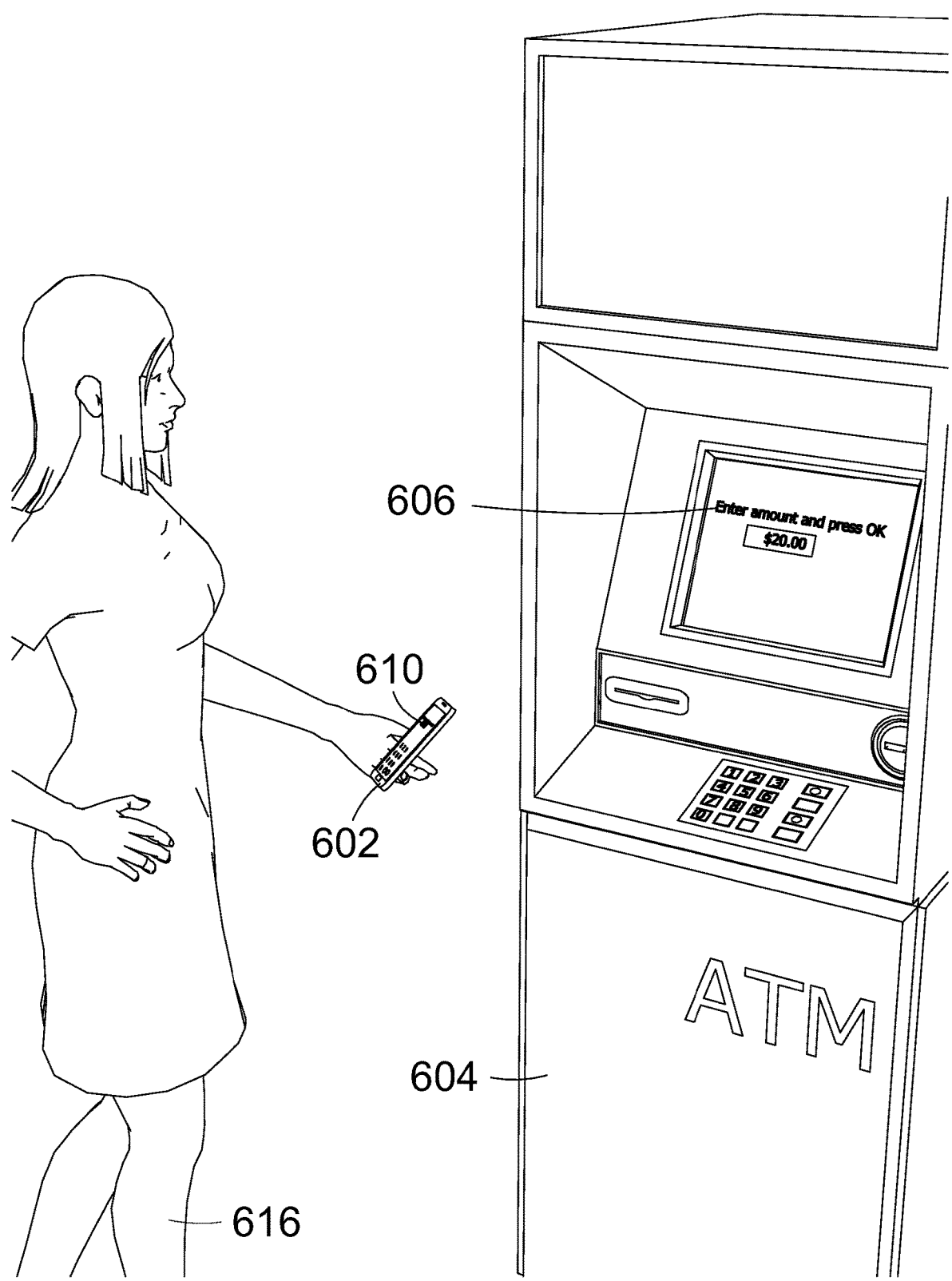
FIG. 5 shows a perspective view, of a phone used to operate an atm, and the atm display.
Figure 6:
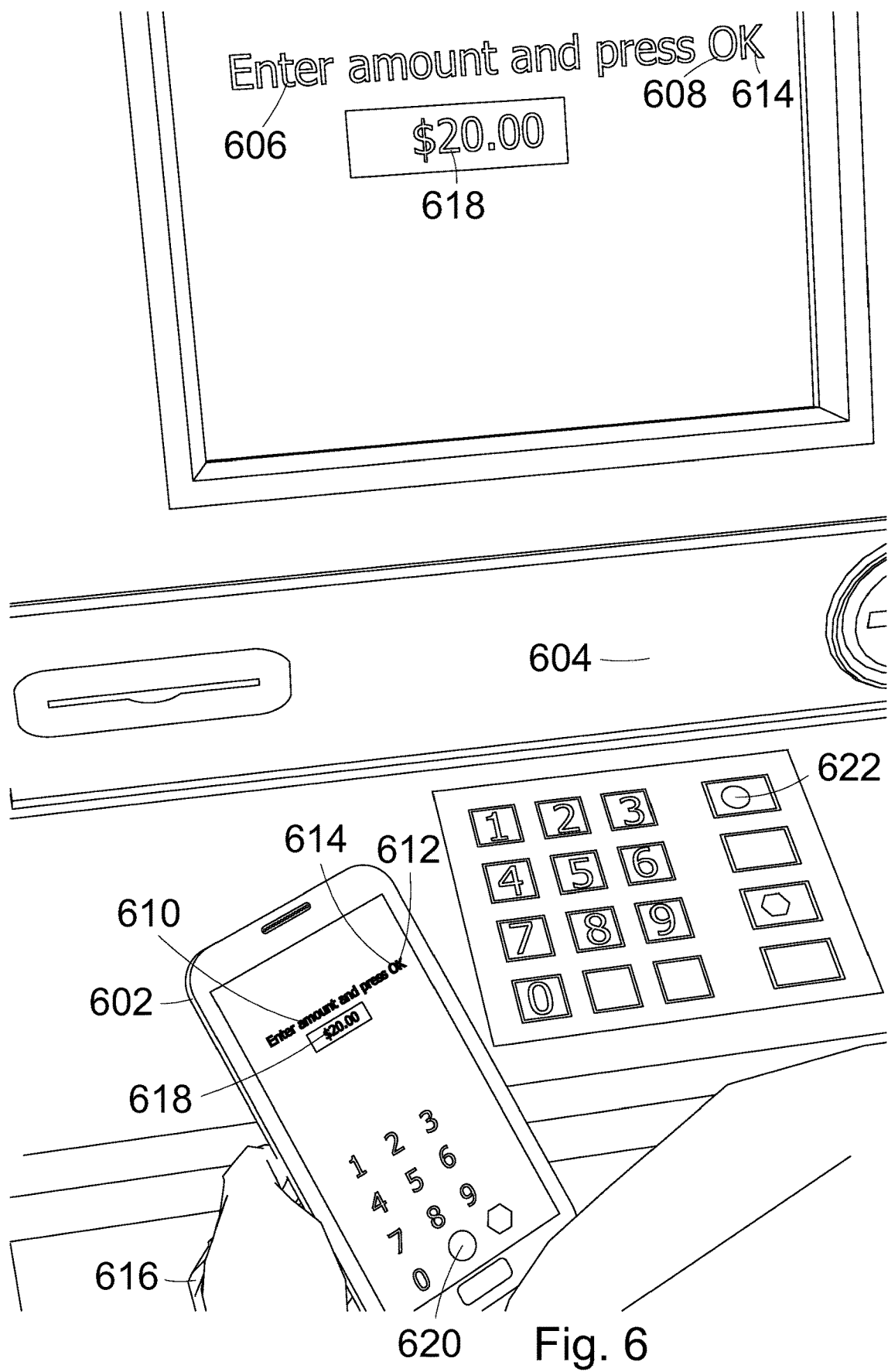
FIG. 6 shows a perspective view, of an atm control panel on a phone, the atm control panel, and the phone connected to the atm.

A phone 602 has a displayed map, as illustrated in FIGS. 5, and 6. The map has a displayed, search function window. A displayed keyboard is used to type into, the search function window. Searches for devices, and devices that can be operated by the phone, such as, ATMs, elevators, smart toilets, can be typed. When the user looks at the map, the devices that the phone can operate are displayed, like, the atm.

When Atm is typed into the search window, Automated teller machine atm s locations are plotted, and displayed on the map. The displayed Atms are shown as icons representative of an ATM.

When the user touches the atm that they want to go to, different fastest routes from the phone's location to the atm, are displayed on the map. The user can follow one of the routes to reach the atm. The phone's display screen is a touch screen.

Phone Connections to The ATM

The phone 602 is connected to the internet, thru a 3g or 4g, or 5 g (generation) mobile micro wave network. The phone is also connectable to WIFI, WIFI direct, internet connections.

The phone is connectable to WIFI, WIFI direct, and or Bluetooth enabled automatic teller machines ATMs. The atm is connected to the internet using by a wired or wireless connection. The atm is connected to the atm's financial institution thru the internet.

The phone's computer is connected, to a phone Bluetooth, or Wi-Fi, light waves, mobile micro wave network radio device transmitter and receiver. The automatic teller machine ATM is connected to an ATM Bluetooth or Wi-Fi, light waves, mobile micro wave network, radio device transmitter and receiver.

Automatic Connection of Phone to Atm

If the phone has connected to the atm before, or a first-time use, the phone can connect automatically to the atm, when the phone is within 20 meters of the atm. An atm icon on the is highlighted showing the phone is connected to the atm.

The atm broadcasts wirelessly, or on the internet, that its available to be operated. The phone searches for devices, like the atm, that broadcasts wirelessly, and or on the internet, that the atm available to be operated by a phone.

A server or servers, that the phone is connected thru, determines, using the phones gps (global positioning system) coordinates, and the atm's gps coordinates, when the phone is 20 meters from the atm. The server plots the phone's location and the atm's location on the map.

At 20 meters, the servers connect, the phone and the atm. The phone and atm can also connect automatically, when the phone detects receiving, the radio waves of the broadcast from the atm, or when the phone is within range, and able to connect to the amt. When the atm is connected, the atm's icon is highlighted on the map, showing that it is connected.

Activating the Atm's Control Panel on The Phone

The atm icon is activatable by the touch of a user's finger. The activated atm icon connects the phone to the atm. When the atm is connected to the phone, the atm sends the phone, the atm's control panel 606. The phone receives the sent control panel and downloads, the atm control panel to the phone.

The phone's display, shows the control panel 610, which displays phone control panel commands 612 of the atm, that are activated by the contact, touch of the user's finger. The activation of one of the commands activates an operation of the atm that is associated to the command, such as, an activated enter ok 614 command, activates an enter operation of the atm's computer.

The Atm Displays the Control Panel

The atm displays the control panel, and the operations on the atm, that is displayed on the phone. The same information displayed on the phone and the atm, reassures the user that they are using the same atm's control panel, menu as the menu show on the phone.

The atm menu application is connected to a cloud server that stores the menu, in a database and handles customers' requests. Every time a customer requests something, the server processes the request and sends an answer. The atm computer is connected to the detect cloud server.

Control Panel Menu Instructions

The control panel displays inputs, commands, Instructions that can be touch activated, including, deposit, withdrawal, checking, savings, credit, a 1-10 number pad, numbers 1, 2, 3, 4, 5, 6, 7, 8, 9, 0, log in, log out, withdrawal 20, 40, 100, enter ok 614, change, and cancel, etc. The activated commands can display, and or active different pages on the display, that are associated to the commands, like, activating will display the deposit page.

Control Panel Saved to Storage

The downloaded control panel is saved to the phone's storage. The phone displays the down loaded atm control panel. The stored atm control panel, is used the next time the atm icon connects the phone.

When the atm 604 is connected to the phone, the atm or phone checks the version of control panel stored on the phone, and if the atm has a new version of the atm control panel, the atm automatically sends the new version to the phone to replace the past version. The new version is received by the phone, and can either automatically replace the past version, or the user can be notified that a new control panel is available to be used, which the user can either activate or not activate.

The computer can act as the primary computer for the atm, and operate the atm, or can connect to an atm computer that operates the atm.

The phone computer is programmed with an atm operating software, a phone software, and a computer operating software. The phone computer is connected to the internet, for communicating to with atm devices, servers, or other computers over the internet. The atm has software operating instructions for the various functions and devices of the atm.

ATM Identifying the User

The user 616 starts a session on the atm, by identifying themselves to the atm. The identified user's account is opened and displayed, on the phone.

A login screen is displayed on the phone. The login screen has a window for the user to type their account number, and another window to type in their password or pin number. The account number and password and pin, can be saved, on the phone or atm, so the accounted is opened by identifying the user.

The user can also login, with a combination of ways to identify themselves to the atm, and or pin, or by identifying themselves.

The user identifies themselves to the atm, by using, either a debit card, or credit card, inserted into a machine card reader. The atm can identify using facial recognition, of the user's face, viewed by a camera in the phone, or an atm camera connected to the atm computer, positioned to view the user's face. A facial recognition software is in the phone computer, or in the ATM computer.

A microphone is part of the phone and connected to the phone computer, or an atm microphone is part of the atm, and connected to the atm computer. The phone has voice recognition software, or the atm has atm voice recognition software. A finger print reader is connected to the atm, or is part of the phone, with either device having finger print recognition software. A radio frequency identification card is part of the phone, and a radio frequency identification card reader is part of the atm. A software digital wallet is part of the phone and includes the user ATM account information.

Users Waiting to Use the Atm

If the atm is being used by another user, the atm puts the user in line for using the atm, and assigns the user a number, like, a number 2 in line. The number 2-line assignment is shown of the user's phone. The atm allows for one operator of the atm at a time.

Manually Determining Which Atm The User Wants to Use, Touching the Atm On the Display to Be Operated With multiple atm, each atm is assigned, a number, or letter, or designation for each atm, like, 1, 2, 3, or a, b, c, d. The number is displayed on the physical atm. The user views the physical atm's number, that they are in line to use.

The map displays the many atms, with each displayed atm displaying the physical atm's number or letter, that the physically displayed number or letter atm corresponds with. The displayed atms are positioned on the map, the same as the physical atms are positioned physically, this allows the use to visually identify the atms positions on the display, with the visual identification of the positions of the physical atms.

Manually Determining which Atm the User Wants to Use

The user touch chooses the atm that on the display that is the same as the number that they are in line to use, or vice versa. The user chooses the atm they want to use on the display and then get in line with the am that is the same as the number item that they have chosen on the display. For example, the user is in line for the number 3 atm, touches the 3 atm on the display, to display the 3-number control panel, or vice versa.

The line, the atm the user is going to use, is assigned a number on the panel, and the same number on the atm, that the user can view. The user can also manually change the amt that they want to use, by touching a different atm.

Interaction with the Menu on the Phone is Shown, on the Atm's Menu

Interaction with the menu on the phone is shown, on the atm's menu, such as, a checking account's information is opened, which highlights it on the phone, the same checking account, is shown as being opened, and hight lighted on the atm display.

The atm displays the menu, control panel on the atm, and menu. The menu, and control panel is also displayed on the phones display. The atm's displayed menu, is cloned to the phones display. The cloned kiosk display menu on the phone is interactive with touch of the menu, and menu commands, as is the atm's physical displayed menu interactive with touch of the menu, and menu commands.

By using the phone to order menu items, the user avoids touching the atm's touch input display, which may have bacteria on it.

Automatically Determining which Atm the User Wants to Use

Using Phone Location Information

The phone using the devices locations, gps, cell tower triangulation, to determine which atm the user is in front of. When its determined which atm the user is in front of, the atm can send the phone the panel, and the phone can automatically display the atm panel for the atm that the user is standing inf front of. The automatic panel displays the panel with the letter, associated to the atm the user is occupying.

The atm can also use the facial recognition to identify the user, viewing the user thru the camera on the phone. The identified user is viewed, by an atm camera positioned to view users in front of the atms, to determine which atm the user is standing in front of. By using the facial recognition to identify the user in front of the atms, and then where the user is located.

The phones control panel is displayed for the atm, that the user is in line for. If the user changes lines, the control panel will change to the line the user is in.

Interaction with the menu on the phone is shown, on the atm's menu, such as, a checking account information is ordered, which highlights it on the phone, the same checking account information, is shown as being ordered, and hight lighted on the atm display.

Using Cameras to Determine User Location

The phone camera, views the user, when the user is looking at the displayed control panel, on the phone screen. The atms cameras view what is in front of the atm. Th atm that sees the user in front of it, and matching the view of the user from the camera, figures the user is in front of the atm, that sees the user in front of it.

The atm's view the view of the user, and determines which atm the user is in front of, since it is viewing the user the user is in front of the atm. The atm analyses to match, the two views, pictures to determine which atm the user is in front of. The control panel user inputs, operates the atm the user is determined to be in front of.

The Phone Map System Operating the Different Devices

The phone map system described in the embodiments uses the same system. The devices that the system operates are different, like, the system operates different devices, that include, smart toilet, atms, elevators, gas pumps, restaurant menus, and self-driving cars. The operation of the system for one device, is implied to be the same system for another device, even if the complete system isn't described. The complete description may not be described for all devices operated by the system, to conserve writing space. The phone finds and operates different devices, the main difference in embodiments is the different operations of the different devices.

Same Phone Map System Used for The Different Devices Embodiments

The atm uses the same process, hardware and incorporates all the parts used in, described in the self-driving car embodiment description and operation, and the other embodiments. For reducing the use of space, the description and operation has been shortened for the atm embodiment.

Software Flowchart

Figure 9:
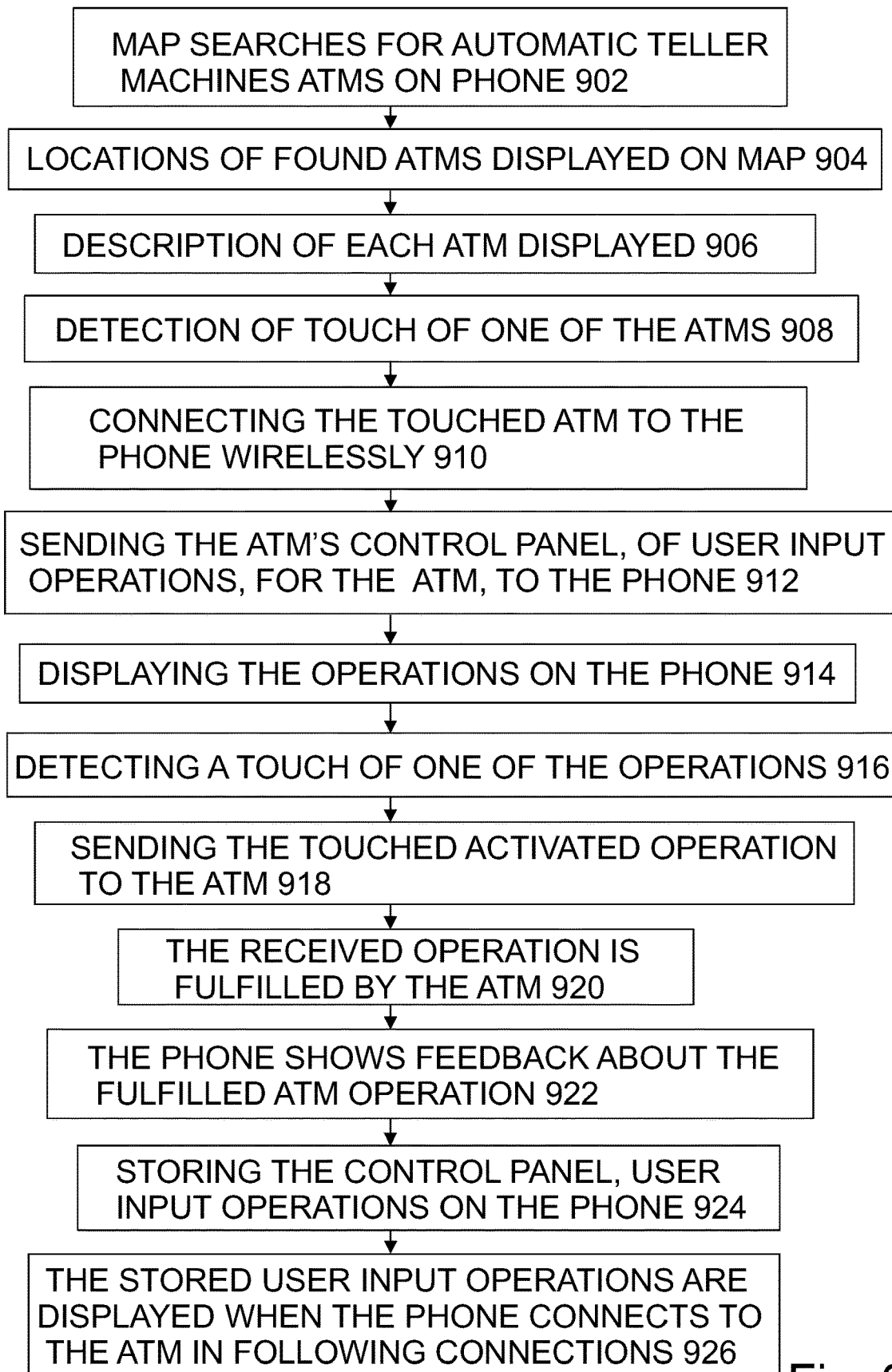
FIG. 9 illustrates a flow diagram of an example, of operation of an atm, by a phone.

Software Flowchart shown in FIG. 9, Map searches for automatic teller machines atms on phone 902, locations of found atms displayed on map 904, description of each atm displayed 906, detection of touch of one of the atms 908, connecting the touched atm to the phone wirelessly 910, sending the atm's control panel, of user input operations, for the atm, to the phone 912, displaying the operations on the phone 914, detecting a touch of one of the operations 916, sending the touched activated operation to the atm 918, the received operation is fulfilled by the atm 920, the phone shows feedback about the fulfilled atm operation 922, storing the control panel, user input operations on the phone 924, the stored user input operations are displayed when the phone connects to the atm in following connections 926.

Block Diagram of Connected Components

Figure 8:
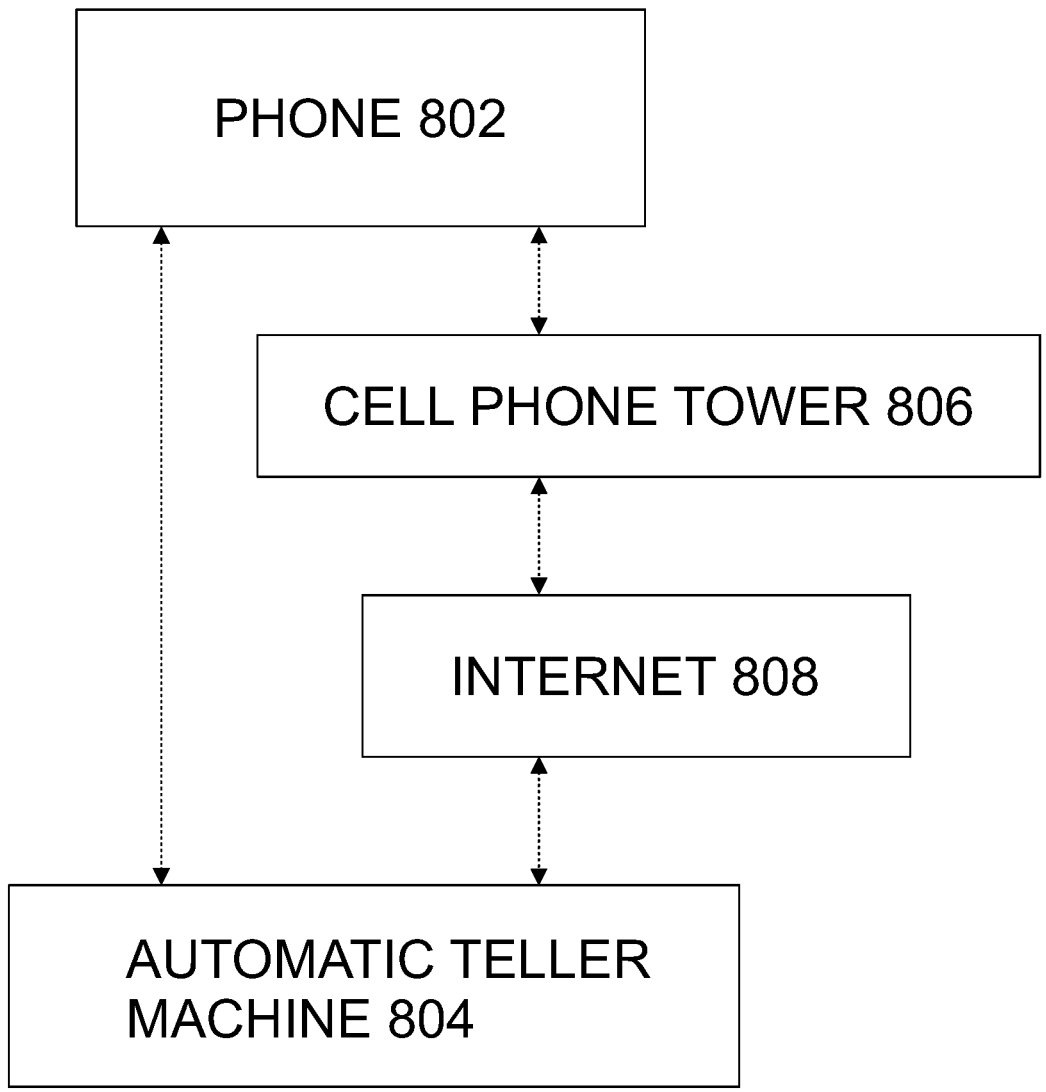
FIG. 8 is a block diagram illustrating an example, of connections between a phone, and an atm.

Block Diagram shown in FIG. 8, Phone 802, automatic teller machine 804, cell phone tower 806, internet 808.

Finding and Operating an Atm with a Phone Operation

The user connects to the internet thru the mobile phone network, or thru a WIFI connection, as illustrated in FIGS. 5, and 6. The user 616 types in ATMs in the search window with on the virtual key board. Available atm machines that are available for operation, by the phone are displayed. The displayed atms show a description, of the atm, such as, the bank associated to the atm.

The user touch chooses one of the atms, and chooses to have directions and routes shown to the atm. The routes include the time to the atm, by car, waking, and public transportation, bus, or subway. The directions and routes are displayed. The user follows one of the routes to the atm.

When the user is close to the automated teller machine ATM, like, 20 meters. The atm icon is activated by touch by the user. The atm control panel is displayed on the display.

Control Panel Menu Instructions

The user touch activates one or more of the control panel displayed inputs, that include amount 618, deposit, withdrawal, checking, savings, credit, a 1-10 number pad, numbers 1, 2, 3, 4, 5, 6, 7, 8, 9, 0, log in, log out, withdrawal 20, 40, 100, enter ok 614, change, and cancel.

Users Waiting to Use the Atm

The user touch chooses one of the displayed atms. The chosen atm sends the user's phone the control panel for the chosen atm. Each atm has a control panel that is specific to the amt, and operates that specific atm. The control panel operates the atm, that is not being used by another user, and the display shows if the atm is unoccupied.

The User Starts A Session on The Atm By Identifying Themselves to The Atm

The user identifies themselves, logs in the user's atm account, by using, either a debit card, or credit card, inserted into the machine card reader, and a password or pin typed into the phones displayed pin number window. The user can be identified using facial recognition of the user's face, viewed by the camera in the phone, or the atm camera, and the facial recognition software in the phone computer, or in the ATM computer, to match a stored facial picture, or facial information of the user, with a match of the picture, identifying the user.

Other ways to identify the user include, the user logins to their account by speaking words that are detected by the phone, or atm microphones, and the voice is identified using the voice recognition software. The user can touch with their finger, the finger print reader on the phone, or the atm to identify. The radio frequency card can be within 5 meters of the atm. The phone's digital wallet connects to the atm, and sends the user's account information to the atm, the user than types in the pin number on the phone, to login to their account, or wallet.

Examples of Operating the ATM with the Phone

The user inputs the deposit input, using touch. The deposit screen is displayed, on the phone. The user touch inputs a 20-dollar amount 618, by touching with their finger, at the numbers 2 and 0 on the number pad consecutively. The finger touch activates the enter ok input 620. The 20 dollars of currency is deposited, and accepted by the atm, and the accepted deposit is displayed by the phone. The user ends the session with the ATM, by using touch, to activate the log out input.

By using the phone to operate the atm, the user avoids touching the atm's physical touch keys, like, the atm enter ok key 622, which may have bacteria on it. A person using a wheel chair, doesn't need to maneuver the wheel chair, to try reach the atm's physical finger touch keys, which may or may not have varies degrees of success. The chair user can operate the atm, at an easy maneuverable distance from the atm.

A user using, a portable oxygen delivery system, doesn't need to worry about a static electric spark, produced by touching the atm's physical keys, and igniting the flowing oxygen, that their breathing, due to the lessening of a possible spark, by using the phone to operate the atm, due to the phone, and user being in the same balanced electric field.

Finding and Operating an Elevator with a Phone Map Description

A Phone has a Displayed Map

Figure 2:
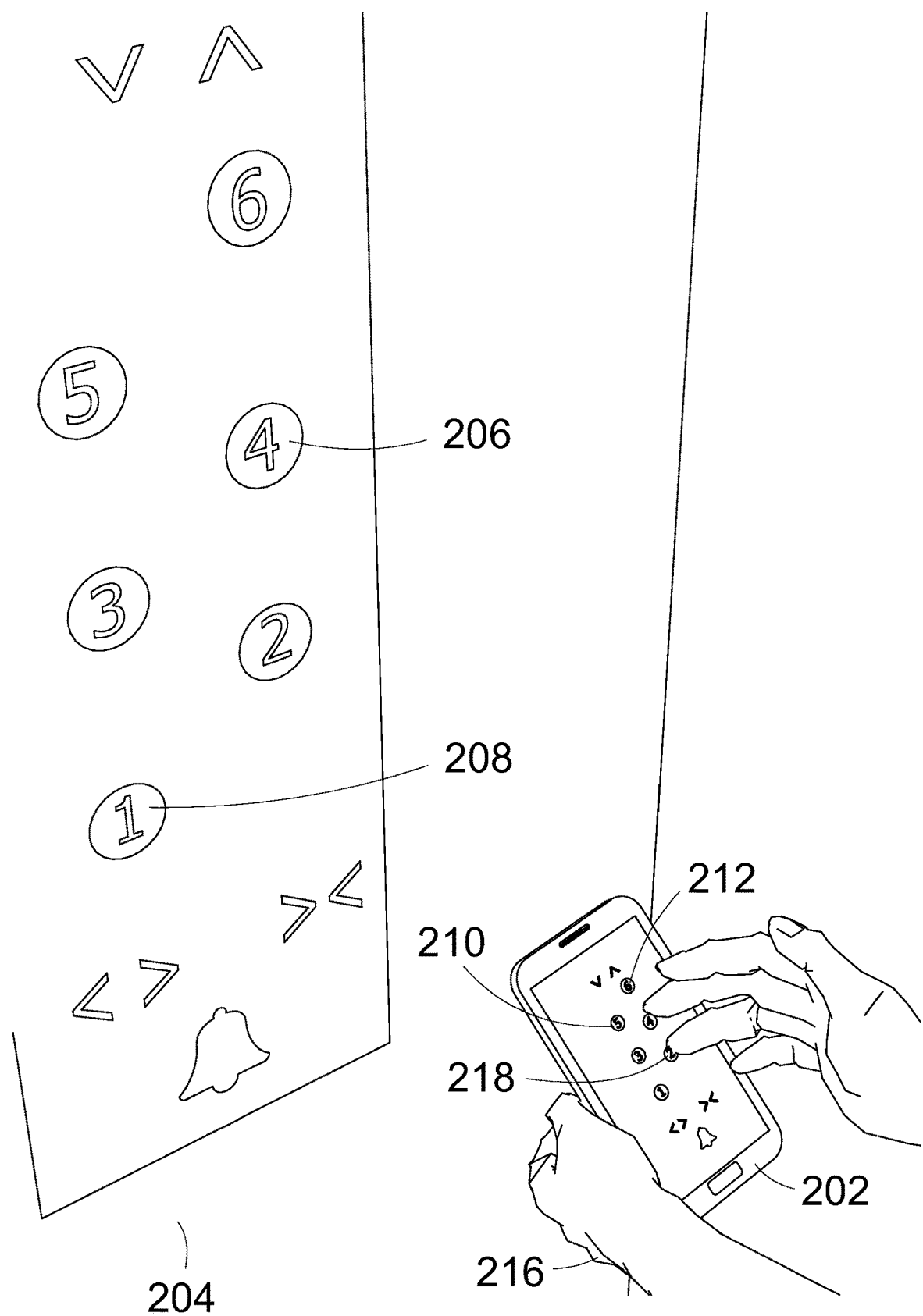
FIG. 2 shows a perspective view, of an elevator control panel on a phone, the elevator control panel display, and the phone connected to the elevator.

A phone 202 has a displayed map, as described in FIGS. 1, and 2. The map has a search window. The phone connects to a sever on the internet. The server has locations of elevators, and other devices like, gas pumps, store check machines, plotted on the map. The phone map has a virtual keyboard.

Typed search results for devices, like, elevator, show displayed icons associated to the devices, at locations on the map, that are associated to the locations of the elevators. The elevator icons visually describe pictorially, or in writing the elevator, such as, a drawing of an elevator, or the word elevator is spelled.

A route function is displayed, that when touch activated, plots a route from the phone to the elevator. Th route follows roads, and routes inside a building housing the elevator, that are accessible by car, and or walking.

Connecting Phone to Elevator

Touch of a chosen elevator, signals the server to connect the phone to the elevator's computer, through the server. The phone 202 asks the elevator 204, for the elevator panel. The elevator can also automatically, send the panel to the phone when they connect.

The phone broadcasts, and receives radio waves. The phone connects to the internet, or to the elevator using radio waves.

The elevator broadcasts and receives radio waves, and can connect to the internet, or to the phone using radio waves. The phone has a phone computer, and the elevator has an elevator computer.

The phone and elevator can also communicate, when they are within radio wave range of each other. The phone and elevator communicate with each other, when they are connected.

Phone Displaying Elevator Control Panel

The elevator detects when the phone, and elevator connect and communicate with radio waves. With the detection of communication signals by the elevator, the elevator sends to the phone, the elevator's control panel 206, or the elevator automatically sends the panel 206 to the phone.

The received panel is displayed. The panel shows icons that are available for the user to activate with touch, that will affect the operation of the elevator. The touch activation of one of the displayed elevator operation icon, signals the elevator's computer by the phone's computer, to activate the elevator operation that is associated to the activated operation icon.

A Control Panel Outside of The Elevator

A control panel on the phone, outside of the elevator, is used to call the elevator to the floor the user is on. The physical control panel, and phone control panel are the same, and show the same interactions, input by the user.

The phone and elevator system determine the floor the user is on, by using GPS in the phone, and elevator, and or cell tower triangulation, or range from Bluetooth or WIFI radio transmitters in the elevator.

The Phone Connects to the Elevator, with Bluetooth or WIFI

Call elevator control panels (not shown) outside the elevator, which are on different floors, each have, and are connected to a blue tooth, cell phone or Wi-Fi Direct radio transmitter and receiver. The control panels connect to one, or more elevator computers. The elevator computer directs the operation of the elevator.

The elevator has a call, up or down button, and physical call buttons, located outside of the elevator, on a floor that the elevator doors open to. To call the elevator, the user activates either the up or down button, by touching either the up or down button on the touch screen.

Elevator that Moves is Many Directions

The call box displays an either up or down icon, for movement up or down. If the elevator goes sideways the box can also display a left, right forward or back icons; for movement left, right forward or back. Activation of the up icon signals the elevator going in the up direction to stop at the floor the user is on, like, the 5th floor, and allow the user to board the elevator.

Inside the Elevator

When in the elevator, the user actives the icons that control the operation of the elevator, while inside the elevator, like, activating the 2 icon, which instructs the elevator to move to the 2nd floor. The activated elevator command signals, the elevator to active the elevator operation, associated to the command.

Commands include, basement floors, parking, ground floor, 1, 2, 3, 4, 5, 6 7, 8 etc., close door, open door, emergency button, user help call, elevator stop, start, and fan. The number 1 elevator operation moves the elevator to the 1st floor. The open-door operation opens the door of the elevator. The stop icon stops, the elevator.

The commands are self-explanatory, descriptive of their association to the operation of the elevator, that they are associated to, such as, the fan button, when activated turns on the fan, when the fan is off, or turns off the fan, if the fan is on.

A physical elevator control panel 206, and user's phone control panel are located inside the elevator. The inside elevator physical control panel 206, and phone control panel 210 are the same, and show the same interactions, input by the user 216.

The elevator displays the menu, control panel on the elevator 204, The menu includes, elevator control panel commands 208. The menu, and control panel is also displayed on the phones display. The elevator's displayed menu, is cloned to the phones display. The cloned elevator display menu 210, which includes, elevator control panel commands 212, on the phone. The phone elevator control panel commands 212, are interactive with touch of the menu, and menu commands, as is the elevator's menu interactive with touch of the menu, and menu commands.

Icons Give Visual Feedback

The control panel can be enlarged or minimized by the user's touch. The icons give visual feedback, that they are being touched, or have been touched. The icons give visual feedback, that they have been activated, such as, changing color, dimming, changing shape, moving, decreasing in size, moving farther away from the user, and showing text. The icons can change color, or size, when being activated, or touched.

The input icons can be visually pleasing, such as, being similar to a rabbit, a flower, and a person's face. The user can set, and input the shape, avatars, movements, activation actions, and colors used for the buttons.

Positioning the Elevator Input Buttons on the Phone's Screen

Many devices menu can be displayed, in the display near each other, such as, displaying a vending machine menu, an elevator call button, and an automatic teller machine.

The inside of the elevator, and outside elevator input panel has software operating instructions, for the various functions and devices of the elevator. The elevator instructions are displayed on the menu by the touch screen.

Communicate Distance Between the Phone with the Elevator

The user can set the distance, that the phone computer detects external devices, that can be operated by the user. Limiting the distance, may limit the distance that the user needs to travel to a device. Limiting the number of devices detected, might be used to filter out too many available choices. The devices connection range to the phone may be limited, by the radio range of the transmitter. The location of the device may limit the devices broadcast range, for example, when the phone is located on a train.

Phone Connecting to Multiple User Public Devices

The phone computer can connect to more than one device at a time, and show the displayed devices, and operate the devices. The phone computer can connect and operate many devices, such as, a gas pump, a medical device, a store checkout station, a smart toilet, an elevator, a vending machine, an ATM, a flammable environment device, a hotel door lock, a rental car lock, a rental car ignition.

The phone can operate, the flammable environment device, may operate a gas compressor's, on off switch. the door's lock, lock or unlocked switch, the car lock's, lock or unlocked switch, the car's ignition, start or accessory setting switch, a gas station convenience store microwave oven on off switch, used by customer to cook food purchased in the store.

The phone can operate, more than one device at a time. Two device operating menus can be shown, on the display. The user can input into the operating menus simultaneously, such as, the user can operate a vending machine, while operating the room lights.

The phone can operate devices made from differing companies, and differing styles of devices. The phone can operate elevators made from differing companies, and differing styles of elevator. The elevator communicates with the phone computer. The elevator downloads the elevator operating menu to the phone. The phone computer can operate the elevator, by using the user's input of the elevator operating menu, on the touch screen display.

Along with displaying the user's devices, the user may receive and show devices from other users, such as, the other user's desktop printer. The other users could be deleted for the menu of available devices, so that they don't appear on the users display. Unwanted devices shown on the display can be removed.

With many devices displayed, the user may scroll or page thru the available devices. The phone can connect to a portable computer, and use the portable computer to, connect to and operate external devices. The user's devices can be password protected, to enable only the user's phone computer to operate their devices.

Connections Between Phone and The Store Computer

The phone computer connects to the restaurant computer, which is connected to the kiosk. The restaurant computer connects to a restaurant employee display.

Different Ways of Communicating with The Elevator and or Another Devices

The phone can act as a control panel, by performing interactions with embedded systems located in its proximity. To support proximity-aware interactions, both the phone and the embedded systems with which the user interacts have short-range wireless communication capabilities. Bluetooth, or Wi-Fi direct is used primary for the short-range wireless technology that will enable proximity-aware communication.

Since multiple embedded systems with different functionalities can be scattered everywhere, the phone can automatically discover, or on-demand embedded systems located in the proximity of the user. This is done using a short-range wireless device discovery protocol.

At discovery time, the phone learns the identity and the description of these systems. Each embedded system can provide its identity information (unique to a device or to a class of devices) and a description of its basic functionality in a human understandable format.

The user has pre-installed on the phone, the interfaces for interacting with the embedded systems. An alternative flexible solution is to define a protocol that allows the phone to learn the interfaces from the embedded systems themselves.

The phone can connect to the internet using the cell phone radio waves that connect to a cell phone network.

Dual Connectivity Model

A universal interaction architecture based on the phone is the dual connectivity model, in which the user connects both to the close-by environment and to the rest of the world through the Internet. This model of interaction is based, on the communication capabilities incorporated in the phone. They have the unique feature of incorporating short-range wireless connectivity (e.g., Bluetooth) and Internet connectivity (e.g., General Packet Radio Service GPRS) in the same phone personal mobile device.

The phone is connected to a cell phone network tower receiver, and transmitter. The phone receives and transmits, data on the cell phone network. This is the enabling feature for a secure and generic framework of services over these phone networks.

For example, an intelligent disabled user door opener equipped with a Bluetooth interface. This embedded system is very simple and is not capable of storing or transferring its interface to the phone. However, it can identify itself to the phone. Using this information, the phone can connect to a server across the Internet (i.e., over GPRS) to download the code of the interface that will allow it to become a detached input device for the door opener.

The phone can also perform authentication over the Internet to ensure that the code is trusted. All further communication between this embedded system and the phone happens by executing the downloaded code. This code will display on the touch screen panel that emulates the panel of the gas pump (i.e., it effectively transforms the phone into an intuitive gas pump detached input device). Control panels can be downloaded from the web that can be downloaded and executed on the gas pump. For this purpose, the gas pump does not have to be connected to the Internet; it is the phone that facilitates this action.

Another typical application is opening/closing an atm. The entry in certain atm's will be protected using Smart atms (e.g., atm s that are Bluetooth-enabled and can be opened using digital atm keys). The dual connectivity model enables users carrying phone to open these atms in a secure manner. The phone can establish a connection with the lock, obtain the ID of the lock, and connect to an Internet server over GPRS to download: The Gateway Connectivity Interaction Model is the code that will be used for opening the atm (a digital atm key can also be downloaded in the same time). The server hosting the interface and the keys for the Smart atm maintains a list of people that can open the atm. The identity of the phone user (stored on the phone in the form of her personal information) is piggybacked on the request submitted to the server. If the server finds that this user can open the atm, it responds with the code for the interface and the digital key.

The dual connectivity model can also be used to implement electronic payment applications. The user does not need to know about a vendor's embedded system in advance. The phone can authenticate the vendor using its Internet connection. The same connection can be used by the user to withdraw electronic currency from their bank and store them on the phone. Another option provided by the phone is to send some of the unused money back into the bank account (i.e., make a deposit each time the amount on the phone exceeds a certain limit). Potentially, the vendor's embedded system can also be connected to the Internet. For instance, this ability can be used to authenticate the user.

Phone and Elevator Connected to The Internet

The phone, and elevator are connected to the internet. Their locations are located on a google internet map. The phone, and elevator identify other devices within their vicinity, such as, the phone detects elevators, atms, vending machines, light switches, smart toilets, and the elevator detects the phone, and other phones.

The phone or the user, requests the elevators operating menu, over the internet, when the phone, are in the vicinity, 6 meters, of the elevator. The elevator sends the phone, the elevator operating menu over the internet. The phone downloads the elevator menu software. The touch screen displays, the elevators menu.

The elevator can also request, over the internet, the phone, to receive the elevator menu software. If the touch phone, agrees to receive the menu software, the elevator sends the phone, the menu software over the internet.

The phone, and elevator pre-register their availability to communicate, send and receive menu software over the internet, Phone Software Architecture This architecture applies to all the proposed interaction models. In the following, is briefly describe the components of this architecture.

The Bluetooth Engine is responsible for communicating with the Bluetooth-enabled embedded systems. It is composed of sub-components for device discovery and sending/receiving data. Although the Java API for accessing the Bluetooth stack has been proposed, it has not yet been implemented. Bluetooth Engine is a layer above the Bluetooth stack and provides a convenient Java API for accessing the Bluetooth stack. The downloaded interface is a Java program which cannot access the Bluetooth stack directly. It depends on the Java API provided by the Bluetooth Engine for communicating with the embedded device.

The Internet Access Module carries out the communication between the phone and various Internet servers. It provides a well-defined API that supports operations specific to our architecture (e.g., downloading an interface). The protocol of communication can be either HTTP or TCP/IP (on top of GPRS).

Discovering the Embedded Systems

The Proximity Engine is responsible for discovering the embedded systems located within the Bluetooth communication range. If an interface for a newly encountered system is not available locally (i.e., a miss in the Interface Cache) or through direct communication with the system, the Proximity Engine invokes the Internet Access Module to connect to an Internet server and download the interface for interacting with the device. The downloaded interface is stored in the Interface Cache for later reuse.

Together with the interface, an access control handler can also be downloaded. Such a handler executes before any subsequent executions of this interface. The Proximity Engine informs the Execution Engine to dispatch the downloaded interface for execution. All further communication between the phone and the embedded system happens as a result of executing this interface.

The Execution Engine is invoked by the Proximity Engine and is responsible for dispatching the downloaded interface program for execution. The downloaded interface interacts with the Bluetooth Engine to communicate with the embedded system or with another phone. This interface may also interact with the Internet Access Module to communicate with the webserver. It may need to contact the webserver for security-related actions or to download necessary data in case of a miss in the Personal Data Storage.

Storing the Code

Interface Cache stores the code of the downloaded interfaces. This cache avoids downloading an interface every time it is needed. An interface can be shared by an entire class of embedded systems, e.g., Elevators. Associated with each interface are an access control handler that executes before any subsequent invocation of this interface (e.g., It checks if the interface is still allowed to run, sets the permissions to local resources).

Personal Data Storage acts as a cache for "active data", similar to Active Cache. It stores data that needs to be used during the interactions with various embedded systems. Each data item stored in this cache has several handlers associated with it that can perform various actions (e.g., access handler, miss handler, eviction handler). Examples of such data include digital or electronic cash. Each time an interface needs some data, it checks this cache. If the data is available locally (i.e., hit) the program goes ahead; otherwise (i.e., miss), it has to use the Internet Access Module to download the data from the corresponding server in the Internet.

Any embedded system is registered with a trusted webserver (the webserver is just a simplification, since this is in fact a web service distributed on multiple computers). At registration, the webserver assigns a unique ID and a URL to the device. All the information necessary to interact with the device along with a user interface is stored at that URL. This URL may be common for an entire class of embedded systems.

The interaction protocol that takes place when the phone needs to interact with an embedded system. The user invokes the Proximity Engine each time user needs to interact with a device located in the proximity. Once the embedded systems in the proximity are identified, the user chooses the one they want to interact with. A request is sent to the embedded system to provide its ID and URL. Upon receiving the ID and URL of the embedded system, the phone executes the access control handler and then loads and executes the interface. In case of a miss in the Interface Cache, the interface needs to be downloaded on the phone either from the webserver or from the embedded system itself.

Trusted Interface Downloads

An interface downloaded from an embedded system is un-trusted and is not allowed to access to local resources on (i.e., sandbox model of execution where it can only execute commands on the device). The interfaces downloaded from the webserver are trusted; they are assumed to be verified before being distributed by the server.

The phone request an interface for the ID provided by the device (using the URL provided also by the device). With this request, the phone also send its ID (stored in the Personal Information Storage). The phone is granted permission to download an interface, subject to the access control enforced based on the phone ID and, potentially, other credentials presented by the user. Once the access is granted, the webserver responds with the interface needed for any further interaction with the device.

The data stored in the Personal Data Storage can be classified into three categories: Description of the downloaded interfaces. The code of the downloaded interfaces is stored in the Interface Cache, but its description is stored in the Personal Data Storage.

Every downloaded interface has an ID (which can be the ID of the embedded system or the class of embedded systems it is associated with). This ID helps in recognizing the cached interface each time it needs to be looked up in the cache. In addition to assigning an ID, the access and miss handlers associated with the interface are also defined. For instance, the user might define the time period for which the interface should be cached, or how and when it can be reused.

Confidential Data

Example of confidential data include electronic cash or digital keys. Every confidential data item has a data-ID and handlers associated with it. The handler's define a mechanism for evicting the data entity, sharing it across applications, or controlling the access to it. For instance, electronic cash can be sent back to the bank at eviction. The handlers also let the phone user have control, over the confidential data stored on the phone.

Any application that needs to access a confidential data item accesses it through the handler. The data item handler may either have an access control list of applications that are allowed to access it, or may pop up a choice menu to the user every time an application tries to access the data entity. Handlers are also provided for fetch data in from the corresponding server when it is missing in the cache.

Personal Information of a User

Personal information of the user in form of his name, credit card information, is stored in this cache. This information is used for authenticating the user to applications that require that level of security, such as the digital-key application mentioned earlier. Personal information is primarily accessed by the architecture components of the phone. Applications may access this information through the handler associated with this data.

Finding and Operating an Elevator with a Phone Map Operation

Finding the Elevator

The user connects to the internet thru the mobile phone network, or thru a WIFI connection, as described in FIGS. 1, and 2. The user types in elevators, in the search window, using the virtual key board. Elevators that are available for operation, by the phone are displayed. The displayed elevators show a description, of the elevators, such as, the floors being used by the elevator, like, 5-8 floors.

The user touch chooses one of the elevators and chooses to have directions and routes to the elevator shown. The routes include the time to the elevator, by car, waking, and public transportation, bus, or subway. The user follows one of the shown routes, to the building with the elevator.

Route Inside the Building

Inside the building, the user follows the route, on the map of the building to the elevator. The map includes, the route on a 1st floor, and stairs to take to the floor that the elevator is on, such as, 2nd floor. Once on the 2nd floor, the map shows a 2nd floor map with route to the elevator.

Example of Elevator Operation

When the user is close to the elevator, like, 40 meters. The elevator icon is activated, by touch by the user. The elevator control panels, outside call buttons, and inside control panel are displayed on the phone display.

Elevator Calling Button Outside the Elevator

Buttons include, up or down buttons 208, ranges from, like, floor 8-14 or floor 1-7. The user touches the up button, while on the 1st floor. The up-button changes from an orange color, to a green colour, to signal that the up button us activated. The phone shows the floor numbers that each of the different elevators are on. The elevator going up stops, and the elevator door opens, allowing the user to enter the elevator.

Inside the Elevator

The letter associated to the elevator control panel is displayed automatically. The user can also manually choose the g letter elevator panel from the display, which shows all the elevators, and the letters associated to each elevator, like, d, e, f, g. The elevator letter g is displayed inside the elevator.

The user touches the 2nd floor icon 218, and the doors start to close. The user presses the door open icon 208, to stop the door from closing, reopen the door, to allow another passenger to enter the elevator. The user presses the close door icon, and the elevator doors close. The elevator moves to the 2nd floor 208. The elevator doors open, and the user vacates the elevator. At 20 meters from the control panels, the panels are removed from the phone display.

Finding and Operating a Gas Pump with a Phone Map Description

A phone has a displayed map. The map has a search window.

Typed search results for devices, like, gas station gas pump, show displayed icons associated to the devices, at locations on the map, that are associated to the locations of the gas pumps, gas fuelling station. The gas pump icons visually describe pictorially, or in writing the gas pump, such as, a drawing of a gas pump, or the word gas pump is spelled.

Gas pump Product Choices

Displayed commands on the phone, include, octane of gas 87, 89, 91, 93, 94, price gas per or litre or gallon, pay with credit card or cash. pay with phone wallet.

The phone receives feedback information, that is displayed on the phone, while the gas pump is operating, such as, how much gas is being pumped into the car, in litres, 27.4 litres, how much is the cost of the gas being pumped is, 5.23.

Finding and Operating a Gas Pump with a Phone Map Operation

Finding the Gas Pump

The user types in gas pumps, in the search window, using the virtual key board. Gas pumps that are available for operation, by the phone are displayed on the map. The user follows a route to one of the gas pumps.

Example of Gas pump Operation

The phone connects to the gas pumps, thru Bluetooth, or using the internet, thru a cell phone tower. The user picks one of the displayed gas pumps, from many gas pumps. The user touches the gas pump icon that's says pump number 3, to open the 3 pump's control panel.

The user touches the 87-gas octane icon, on the control panel, displayed on the phone, and the 87 is highlighted. The pump is turned on. The user pumps the 87 gas into a car, with a gas hose nozzle, that is connected to the gas pump and car. When the user stopping fuelling filling the car's gas tank, the car's price, for the gas is displayed on the phone. The user touches a pay gas icon, and an input payment method is displayed. The user chooses to pay with credit card or debit card. The user pays by touching the credit card pay icon, a credit card on the phone is charged for the payments.

Gas Pump

The user uses the interactive input display, to operate a gas pump. The user can activate the pump's input icons, by touching the displayed icons. The user touches the gas pump input icons, to choose the octane of gas, or pay for the gas. The activated icons, are displayed, are associated with the operation of the pump, and activate gas pump functions, such as, delivery of gas, or payment of the gas. The phone receives feedback information, while the device is operating, such as, how much gas is being pumped, into the car.

Finding and Operating an Electric Car Charging Station with a Phone Map Description A phone has a displayed map. The map has a search window.

Typed search results for devices, like, electric car charging station, electric car fuelling station, show displayed icons associated to the devices, at locations on the map, that are associated to the locations of the charging station. The charging station icons visually describe pictorially, or in writing the charging station, such as, a drawing of a charging station, or the word charging station is spelled. The user can view, the car fuelling, charging stations on the phone.

Charging Station Product Choices

Displayed commands on the phone, include, start charge, stop charge, do you need more time, yes no, pay with credit card or cash. pay with phone wallet. Choose your connector, SAE Combo, CHAdeMO. Choose level 1 change, 2, 3 DC fast charge. The car and station are equipped with a wire or Bluetooth or infrared light, which allows the station and car to communicate with each other, when they are in close vicinity with each other.

Charging Station Feedback

The phone receives feedback information, that is displayed on the phone, while the charging station is operating, such as, how much voltage is being charged to the car's batteries, 120 volts, 240 V, direct current DC fast charge, the percentage change of the batteries, time till fully changed or 100 charged, how much the cost of the electricity, being charged to the batteries is.

Finding and Operating an Electric Car Charging Station with a Phone Map Operation Finding the Charging Station The user types in electric car charging stations, in the search window, using the virtual key board. Charging stations that are available for operation, by the phone are displayed on the map. The user follows a route to one of the charging stations.

Example of Charging Station Operation

The phone connects to the electric car charging station, thru Bluetooth, or using the internet, thru a cell phone tower. The user picks one of the displayed charging stations, from many charging stations. The user touches the charging station icon that's says charging station number 3, to open the 3 charging station's control panel.

The user connects a charging wire from the charging station to the car. The charging station is turned on. The user touches the 240V icon, displayed on the phone, the 240V icon is highlighted, and the 240V delivery system is activated. The user presses the start button, displayed on the phone, and electricity starts flow from the station to the car, until the car's batteries are 100 percent charged, or another percentage of the user's choosing, or until the user stops the charging, by touching the stop button displayed on the phone, which stops the electricity's flow to the car's batteries. The user pays by touching the credit card pay icon, the credit card on the phone is charged for the payments.

Charging Station Interactive Input Display

The user uses the interactive input display on the phone, to operate the charging station. The user can activate the pump's input icons, by touching the displayed icons. The user touches the charging station input icons on the phone, to choose the charging voltage, or pay for the electricity. The activated icons, are displayed, are associated with the operation of the charging station, and activate charging station functions, such as, delivery of electricity, or payment of the electricity charge. The phone receives feedback information, while the device is operating, such as, how much electricity is being charged to the car's batteries.

Finding and Operating an Hydrogen Car Refuelling Station with a Phone Map Description A phone has a displayed map. The map has a search window.

Typed search results for devices, like, hydrogen car fuelling station, show displayed icons associated to the devices, at locations on the map, that are associated to the locations of the fuelling station. The fuelling station icons visually describe pictorially, or in writing the fuelling station, such as, a drawing of a hydrogen station, or the word hydrogen station is spelled. The user can view, the car fuelling stations on the phone. The fuelling station can also fuel trucks, airplanes, helicopters, motor cycles, mobile homes, boats, and buses, and can be found by searching under each vehicles name.

Charging Station Product Choices

Displayed commands on the phone, include start charge, stop charge, do you need more fuel, yes or no, pay with credit card or cash. pay with phone wallet. Choose your amount of hydrogen to be fuelled, half fill H35, or full fill H70.

The user can choose between, filling the tank, by choosing H70, or filling the tank half way, with pressurized hydrogen, by choosing H35, 350 bar (35 MPa,) 5,000 psi, or H70, 700 bar, (70 MPa), 10,000 psi Fuelling Station Feedback The phone receives feedback information, that is displayed on the phone, while the fuelling station is operating, such as, price 4.19 kg, sale 6.74, vehicle fuelling in progress, press stop fuelling to stop hydrogen fuelling, hose pressure 3826.74 psi, vehicle tank data temperature 72.86 c, pressure 6017.40 psi, Shown on the phone, is the flow rate of hydrogen going into the fuel tank. The percentage of fuel in the car's tank, time till fully filled tank, or half-filled tank, the cost of the hydrogen that has already been put in the car's tank.

Finding and Operating an Hydrogen Car Refuelling Station with a Phone Map Operation Finding the Charging Station The user types in hydrogen car fuelling stations, in the search window, using the virtual key board. Refuelling stations that are available for operation, by the phone are displayed on the map. The user follows a route to one of the fuelling stations.

Example of Hydrogen Fuelling Station Operation

The phone connects to the hydrogen car charging station thru Bluetooth, or using the internet, thru a cell phone tower. The user picks one of the displayed charging stations, from many charging stations. The user touches the fuelling station icon that's says charging station number 4, to open the 4 station's control panel.

The user connects a hose nozzle, and wire that's part of the hose, from the fuelling station to the hydrogen car, and car's hose and wire connector respectable. The hydrogen fuelling station is turned on, and fuel starts flowing to the car. The wire or the car and station are equipped with Bluetooth or infrared light, which allows the station and car to communicate with each other.

The user touches the H35 icon, the H35 icon is highlighted, and the H35 delivery system is activated.

The user presses the start button, displayed on the phone, and pressurised hydrogen starts flowing from the station to the car, until the car's tanks are 100 percent full, or another percentage of the tanks volume, of the user's choosing, or until the user stops the fuelling, by touching the stop button displayed on the phone, which stops the hydrogen's flow to the car's tanks. The user pays by touching the credit card pay icon, the credit card on the phone is charged for the payments.

Fuelling Station Feedback

The charging station may send the phone, information on the progress, of the car. and station's interaction, such as, the price of hydrogen per kilogram 4.19 kg, amount of purchase sale 6.74 total amount, vehicle being fuelled in progress, start fuelling to start fuelling, press stop fuelling to stop hydrogen fuelling, hose pressure 3826.74 psi, vehicle tank data temperature 72.86 c, vehicle tank pressure 6017.40 psi.

The car tank may have a capacity of 6.4 kg of compressed hydrogen, the tank can be filled with any amount up to the capacity of the tank. Communication between the car, and station, may be, infrared, Bluetooth, or by the wire attached to the fuelling hose.

The user uses the phone's, interactive input display, to operate the charging station. The user can activate the pump's input icons, by touching the displayed icons. The user touches the hydrogen station input icons on the phone, to choose the hydrogen pressure, or pay for the hydrogen.

The activated icons, are displayed, are associated with the operation of the charging station, and activate charging station functions, such as, delivery of hydrogen, or payment of the amount of hydrogen delivered. The phone receives feedback information, while the device is operating, such as, how much hydrogen is being pumped into the car's hydrogen storage tank, showing the pressures of the car's tank, like, 4000 pounds per square inch psi.

Finding and Operating a Self-Serve Store Checkout Machine with a Phone Map Description User Finds a Store by A Using Map The user can find a store's location, on a displayed map. The user types in store, in the search window, using the virtual key board. Stores that are available for operation, by the phone are displayed on the map. The user follows a route to one of the stores. When the phone is in the store, the phone connects to the store's computer.

Users Waiting to Use the Checkout Machine

With multiple self-serve checkout machines, each checkout machine is assigned, a number, or letter, or designation for each checkout machine, like, 1, 2, 3, or a, b, c, and d. The user touch chooses the checkout machine that they want to use, from the display checkout machines.

Automatically Determining Which Checkout Machine, The User Wants to Use

The phone using the devices locations, gps, cell tower triangulation, to determine which checkout machine the user is in front of. When its determined which checkout machine the user is in front of, the checkout machine can send the phone the panel, and the phone can automatically display the checkout machine panel for the checkout machine that the user is standing inf front of. The automatic panel displays the panel with the letter, associated to the checkout machine the user is occupying.

The checkout machine can also use the facial recognition to identify the user, viewing the user thru the camera on the phone. The identified user is viewed, by a checkout machine camera positioned to view users in front of the checkout machines, to determine which checkout machine the user is standing in front of. By using the facial recognition to identify the user in front of the checkout machines, and then send the panel for the machine, where the user and machine is located.

The phones control panel is displayed for the checkout machine, that the user is in line for. If the user changes lines, the control panel will change to the line the user is in. The line for the checkout machine the user is going to use, is assigned a number on the panel, and the same number on the machine, that the user can view.

The user can also manually change the checkout that they want to use, by touching a different checkout number icon.

The touch screen on the phone's screen can be used to shop in a store, without interacting with a store employee. The user can self-serve checkout at a self-serve checkout station, by using touch to activate input items on a store self-serve check out pay station.

Store Commands

Store input icon commands correspond to operations of the checkout station like, enter, cancel, look up vegetable or fruit item, bananas, or celery. Pay for order with debit car, or credit card, or cash, donate to charity.

The finger touches the number 7 icon, and the 7 is activated. The 4 is used to type, a personal identification number PIN, into the computer. A 2 number can be touched, to input the amount of 2 oranges the user has, when asked by the checkout how many oranges the user has.

The phone's touch screen displays, the checkout station control panel. The user checkouts using a barcode scanner incorporated into the checkout station, by scanning the items barcodes with the checkout station barcode scanner. The user can also checkout using a barcode scanner incorporated into the phone, by scanning the items barcodes with the phone barcode scanner.

The scanned items, and prices of the items, are put in an order, containing the products that the user is purchasing. The order is displayed on the phone's display. The prices of the products are added, together to calculate a total price for the products.

Store items can include, socks, milk, bread, coffee, shoes, multi vitamins, bread, toilet paper, mints, gum, frozen vegetable, bananas, apples, orange juice, hot dogs, cat food, dog food, car oil, pants, shirts, candles, note books, jackets, shorts, tennis rackets, hamburger, salmon, dish washing soap, potation chips, chicken soup, spinach, canned beans, bran cereal, potatoes, onions, avocados, celery, mushrooms, blueberry pie, pizza, french fries, and ice cream The user can pay for the items on the display with a credit card that is stored on the phone, and shown on the phone's screen, with a store credit card reader. The items anti-theft devices connected to the items, can be turned off after payment.

The camera in the phone, can view the items before payment, to make sure the user hasn't made a mistake with the number of items, and that all items have been charged. If a mistake is detected the phone audibly or visually displayed by the phone, to alert the user of the mistake.

The checkout process is monitored by store employees, who view the process on store display screens, and view the same screen that the user touches, and viewed by the user. The user could also pick items, record their barcode on the phone, have robots assemble the order, and at checkout have the recorded items brought to them.

The user can also touch with their fingers, detected by and touch screen at the one of the displayed items, that they want to activate, such as, the enter input icon command, the enter icon command is clicked, and activated.

The mobile device computer and external devices use a universal software enabling the communication between the mobile device computer and the external devices. The mobile device computer, and devices use a universal software platform of software, and hardware, which allow the devices computer to communicate with the phone's computer.

The products can be equipped with anti-theft devices, that signal that they haven't been purchased, and if the user leaves the store without paying, a visual or audible alarm would be activated, that would signal store employees, to check the items the user has. The order is paid for with a credit card, that is inserted into a credit card reader, or is stored on the phone.

Finding and Operating a Self-Serve Store Checkout Machine with a Phone Map Operation Route Inside the Building Inside the building, the user follows the route, on the map of the building, to the checkout machine. The map includes, the route on a 1st floor, and stairs to take to the floor that the checkout is on, such as, 2nd floor. Once on the 2nd floor, the map shows a 2nd floor map with route to one of the checkout machines.

Example of Self-Serve Checkout Machine Operation

When the user is close to the self-serve checkout machine, for instance, 10 meters, the checkout machine icon is activated, by touch by the user. The activated checkout machine icon activates, the displaying of the checkout machine's control panel, on the phone's display.

The control panel for the checkout machine is displayed. The user touches the start icon on the panel, and the start screen is displayed on the phone. The user scans a can of soup on the checkout machine, the price of the soup is displayed, on the phone.

The user touches the checkout icon, the user is how many plastic grocery bags they are purchasing, the user inputs 3 bags purchased, the bag amount is added to the purchase. The pay icon is touched, and the items prices are totalled. The user is given a choice to pay with a credit card icon displayed on the phone.

The user touches the credit card icon, to pay with the credit card stored on the user's phone. The touched icon shows the user's credit card. The total is paid for, when the user's credit card is touched. The user pays the total with the credit card stored, on the phone, or with money taken from a debit credit card linked, to the user's checking account, on the phone.

Alternative Embodiment Phone Scanner

In an alternative embodiment the phone has a laser, that scans the bar codes on the products, or a camera in the phone, is used as a visual scanner. The phone scans on products like, cans of corn, milk cartons, and egg cartons. The visual scanner may scan product identifiers, that are or are similar to a Quick Response code QR code. The items scanned by the phone are displayed on the phone, with their associated price. The phone communicates with a store computer wirelessly.

The control panel for the checkout machine is displayed. The user touches the start icon on the panel, and the start screen is displayed on the phone. The user scans a bottle of mustard on the phone, the price of the mustard is displayed, on the phone, with the price associated to the mustard description. The user touches the checkout icon. The user inputs 2 bags purchased; whose price is added to the purchase amount. The pay icon is touched, and the items price are totalled. The total is paid for, when a credit card icon is touched. The user pays with their credit card, which is stored on the phone.

Camera Checking that Items are Scanned

The items are scanned by the phone, and are then moved to an area that is for scanned items. A store camera views the phone, the scanned item, the scanned area, and views that the item placed in the scanned area, has been scanned by the phone, this is to avoid an item being placed in the scanned area, that hasn't been scanned. An item placed in the scanned is that hasn't been scanned, will stop the scanning processes, and alert an employee to assist the user to remove the unscanned item from the scanned area, to continue the scanning of other products. The store camera, is connected to the store computer.

Automatic Turning of Car Lights on and Off Description

The sensors connect to a car computer, in a car. The computer connects to a switch, that connect to a power source, that powers the head lights, and parking lights. The computer can turn off or on the head lights, by activating the switch to turn on or off. On supplies power, off doesn't supply power.

The computer has a clock, and a time of the day clock. The time setting that the lights turn of or off can be changed by the user, thru a touch screen interface that displays touch interactive settings for the system.

The computer connects to lights sensors. The computer connects to a cell phone towers, with a cell phone radio wave transmitter, and receiver in the car, and wifi transmitters, and receiver. The computer connects to a global positioning system sensor (gps). The car gps, connects to gps satellites.

Automatic Turning of Car Lights on and Off Operation

Car lights can automatically turn on, 30 minutes before sun set, and 30 minutes after sun rise. The car turns on a clock for counting to the 30 minutes, when light levels are sensed, at sunset or sunrise. Light sensors in the car interior, are positioned to detect the sunset or sunrise light levels, outside of the car.

Also, light sensors in the car interior, are positioned to detect light levels, outside of the car when the sensors detect low light levels, the car headlights are turned on. The sensors, are positioned and designed, to avoid light from other cars head lights, street lights, effecting the turn on or off of the car headlights. The lights stay on for 3-8 minutes after detecting light that is similar to daylight, A time of the day clock can turn car lights turn on 30 minutes be sun set, and 30 minutes after sun rise, by detecting the time of the day. The car determines the sun set, and sun rise time by the car's location. The car has a gps which determines the latitude and longitude, and updates them as the car changes location. The location can also be determined by communication with cell phone radio towers. The clock determines the date, which allows it to know the time the sun sets and raises for the location and date. The car can connect to the internet, thru cell phone tower connections, or wifi connection, and receive updated time and date information, or use a clock in the car that counts the time and date.

The light sensors, and gps information can be used tighter, to back of the verification of sun rise and sun set, or used separately.

CONCLUSIONS, RAMIFICATIONS AND SCOPE

From the preceding description, and drawings it becomes apparent that the user, may use a phone to find, and operate multiuser devices sanitarily. Many public multiuser devices, are now able to be found, and operated by the user, with the phone, and phone map.

The user can find a multiuser, public device with a map on the phone, and operate the device with the phone. The touch input allows, input to multiuser devices, without the need to contact the device's physical control panel surface. Avoiding contact with the device's control panel surface, decreases the chance of contacting bacteria on the surface, with the user's finger. Avoiding bacteria increases the ability, to remain free from bacteria, bacteria which may have a negative impact on the user's health. For example, the phone's touch input, can be used to direct the operation of devices, such as, a smart toilet, and then a self-driving car sanitarily.

Thus, the reader will see that at least one embodiment, of the phone connected to a device, and map used to find the device, provides a more reliable, fun, healthier and economical device that can be used by persons of almost any age.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A phone has a map, the map displays devices that are public devices which users can interact with, comprising, the map has a search function, a keyboard is associated to the search function and displayed, names of devices typed into the search function display the named devices on the map, each of the displayed devices has a description associated to the device, each description describes the device that it is associated to, a user's finger's contact with one of the devices connects the contacted device to the phone, the connection of the phone to the device activates a sending of the device's control panel from the device to the phone, the received control panel is displayed on the phones display, the control panel displays descriptions of operations of the device, detection of the user's finger with one of the displayed operations activates the displayed operation detected being contacted, wirelessly connects the contacted device to the phone, the wireless connection is the phone having an internet connection to a phone server, the device having an internet connection to a device server, the device server having an internet connection to the phone server, the device and phone connecting through the internet, the activation of the displayed operation is associated to an activation of an operation of the device that is described by the displayed operation, the activated operation of the device effect's the operation of the device, the effected operation of the device is sent from the device to the phone, the received effected operation of the device is displayed on the phone.

2. The phone with the map of claim 1, wherein the connects the contacted device to the phone is a wirelessly connects the contacted device to the phone, the wireless connection is a radio wave connection.

3. The phone with the map of claim 1, wherein one of the devices is a car that drives itself, the car is displayed on the phone and includes a start travel operation.

4. The phone with the map of claim 1, wherein one of the devices is an elevator, the displayed elevator operation is a floor, the elevator operation is the elevator moving to a-floor.

5. The phone with the map of claim 1, further including the control panel is stored on the phone's computer, the phone is configured to display the stored control panel when the phone connects to the device.

6. The phone with the map of claim 1, wherein one of the devices is an automatic teller machine, the automatic teller machine is displayed on the phone and includes a deposit command operation.

7. The phone with the map of claim 1, further including the phone has a microphone and a voice recognition software, the phone detects voice names of devices, detected voice names of devices are inputted into the search function, the phone's detection of the user's voice description of one of the displayed devices connects the described device to the phone, the displayed operations are activated by a detection of a vocalization describing one of the operations.

8. The phone with the map of claim 1, wherein one of the devices is a restaurant menu, the displayed restaurant menu operation is an order complete command, the restaurant menu operation is the operation of an order complete.

9. The phone with the map of claim 1, wherein one of the devices is a store checkout machine that is operated by the user by self serve, the displayed store checkout operation being an order complete, the store checkout operation being the operation of an order complete command.

10. A method for using a map on a phone to find devices that are public multiuser devices, comprising:

associating a search function to the map, associating a keyboard to the search function, typing a name for one of the devices into the search function with the keyboard, searching for the named device, displaying the locations of the found device, displaying descriptions of the found device, touching on the map one of the described devices, and thereby connecting the selected device wirelessly to the phone, sending descriptions of operations that are different from each other of the device to the connected phone, displaying the received descriptions of operations of the device on the phone, touching one of the operations listed on the display, thereby activating the selected operation by sending a signal to the device, connecting the phone connects to a brainwave device, using a search function thought command, inputting devices into the search function, detecting the user's thought description of one of the displayed devices connects the described device to the phone, activating displayed operations by detecting an operation thought command by the user, effecting the operation of the device with the received activated operation, sending a description of feedback of the effected operation of the device to the phone, displaying on the phone the received description of feedback of the effected operation of the device.

11. The method of claim 10, wherein the wireless connection is a wireless connection through an internet.

12. The method of claim 10, wherein the sending descriptions of operations that are different from each other of the device to the connected phone is the connecting of the phone to a webpage that displays the operations of the device.

13. The method of claim 10, wherein the wireless connection is the phone having an internet connection to an internet server, the device having an internet connection to the internet server, the device and phone connecting thru the internet server.

14. The method of claim 10, wherein one of the devices is a car fueling station, the displayed car fueling station operation being a start fuelling, the car fueling station operation being the operation of a delivery of a fuel to the car.

15. The method of claim 10, wherein one of the devices is a vending machine, the displayed vending machine operation being a product selected command, the vending machine operation being the operation of a delivery of a selected product.

16. The method of claim 10, wherein one of the devices is an automatic teller machine, the displayed automatic teller machine operation is a withdraw command, the automatic teller machine operation is the operation of a withdraw.

17. The method of claim 10, wherein one of the devices is a smart toilet, the displayed smart toilet operation is a back wash, the smart toilet operation is the operation of a back wash.

18. The method of claim 10, wherein one of the devices is a door opener, the displayed door opener operation is an open command, the door opener operation is the operation of a door open operation.

* * * * *